United States Patent
Suzuki

(10) Patent No.: US 9,976,508 B2
(45) Date of Patent: May 22, 2018

(54) INTERNAL COMBUSTION ENGINE

(71) Applicant: Toyota Jidosha Kabushiki Kaisha, Toyota-shi, Aichi-ken (JP)

(72) Inventor: Tatsuya Suzuki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

(21) Appl. No.: 15/476,229

(22) Filed: Mar. 31, 2017

(65) Prior Publication Data

US 2017/0298856 A1    Oct. 19, 2017

(30) Foreign Application Priority Data

Apr. 19, 2016    (JP) ................ 2016-083855

(51) Int. Cl.
*F02D 41/30*    (2006.01)
*F02D 41/00*    (2006.01)

(52) U.S. Cl.
CPC ..... *F02D 41/3029* (2013.01); *F02D 41/0002* (2013.01); *F02D 41/3064* (2013.01); *F02D 2200/101* (2013.01); *F02D 2200/1002* (2013.01)

(58) Field of Classification Search
CPC ............. F02D 41/3029; F02D 41/3017; F02D 41/3035; F02D 41/3041; F02D 41/3064; F02D 41/3076; F02D 41/3094; F02D 41/30; F02D 41/0002; F02D 2200/101; F02D 2200/1002; F02D 2041/0015; F02D 2041/002; F02D 2041/001
See application file for complete search history.

(56) References Cited

U.S. PATENT DOCUMENTS

| | | | | | |
|---|---|---|---|---|---|
| 5,970,948 | A | * | 10/1999 | Yasuoka | F02B 17/005 123/295 |
| 5,975,045 | A | * | 11/1999 | Mizuno | F02D 41/0002 123/295 |
| 6,234,139 | B1 | * | 5/2001 | Taga | F02D 41/0002 123/295 |
| 6,267,095 | B1 | * | 7/2001 | Ikeda | F02D 41/0057 123/295 |
| 2009/0234556 | A1 | * | 9/2009 | Kang | F02B 1/08 701/102 |

FOREIGN PATENT DOCUMENTS

| JP | H06159119 A | 6/1994 |
|---|---|---|
| JP | H10103120 A | 4/1998 |
| JP | 2002-070613 A | 3/2002 |

* cited by examiner

*Primary Examiner* — Lindsay Low
*Assistant Examiner* — George Jin
(74) *Attorney, Agent, or Firm* — Dinsmore & Shohl LLP

(57) ABSTRACT

When switching the combustion mode from a stoichiometric mode to a homogeneous lean mode, a controller starts switching of the combustion mode after switching of the opening angle of a tumble control valve is started. When a target operating point of an internal combustion engine lies outside a predetermined operational region that is set in a range that excludes at least a low intake load factor region and includes at least a medium intake load factor and medium engine speed region, the controller sets the waiting time from the start of switching of the opening angle of the tumble control valve to the start of switching of the combustion mode to be longer than when the target operating point lies in the predetermined operational region.

8 Claims, 17 Drawing Sheets

| | COMBUSTION LIMIT MARGIN IS NARROW | COMBUSTION LIMIT MARGIN IS WIDE |
|---|---|---|
| VARIATION OF COMBUSTION LIMIT A/F IS GREAT | ROBUSTNESS OF COMBUSTION = LOW | ROBUSTNESS OF COMBUSTION = RELATIVELY LOW |
| VARIATION OF COMBUSTION LIMIT A/F IS SMALL | ROBUSTNESS OF COMBUSTION = RELATIVELY LOW | ROBUSTNESS OF COMBUSTION = HIGH |

INTERNAL COMBUSTION ENGINE

CROSS-REFERENCE TO RELATED APPLICATION

This application is based on and claims the benefit of Japanese Patent Application No. 2016-083855, filed on Apr. 19, 2016, which is incorporated by reference herein in its entirety.

BACKGROUND

Field of the Disclosure

The present disclosure relates to an internal combustion engine. In particular, it relates to an internal combustion engine that can switch between a mode in which fuel combustion occurs at an air-fuel ratio leaner than a theoretical air-fuel ratio in a state where fuel and air are homogeneously mixed and a mode in which fuel combustion occurs at an air-fuel ratio at the theoretical air-fuel ratio.

Background Art

JP2002-070613A proposes switching the combustion mode after a predetermined time has elapsed since the operational state of an air flow control valve is switched when switching from a homogeneous combustion, in which fuel and air are homogeneously mixed, to a stratified combustion, in which the air-fuel ratio of the air-fuel mixture can be leaner than the theoretical air-fuel ratio.

In addition to this patent literature, for example, JP10-103120A and JP06-159119A also show the level of the related art at the filing date of this application.

SUMMARY OF THE DISCLOSURE

The conventional techniques described above are proposed for the purpose of suppressing the impact of simultaneous switching of the combustion mode and the operational state of the air flow control valve. From the viewpoint of fuel economy, however, it is desirable to switch the combustion mode as soon as possible after the operating point of the internal combustion engine enters an operational region where the stratified combustion is allowed. This holds true not only for the case where the operation at the air-fuel ratio leaner than the theoretical air-fuel ratio is achieved by the stratified combustion but also for the case where the operation is achieved by the homogeneous combustion. In the following, an operation mode in which stratified combustion of the air-fuel mixture with an air-fuel ratio leaner than the theoretical air-fuel ratio occurs is referred to as a stratified lean mode, and an operation mode in which homogeneous combustion of the same air-fuel mixture occurs is referred to as a homogeneous lean mode. An operation mode in which homogeneous combustion of an air-fuel mixture at the theoretical air-fuel ratio occurs is referred to as a stoichiometric mode.

From the viewpoint of exhaust gas emissions, operation in the homogeneous lean mode, in which fuel and air are homogeneously mixed, is preferred over operation in the stratified lean mode. However, although the stratified lean mode ensures relatively high combustion stability, the robustness of the combustion significantly varies with the operational region in the homogeneous lean mode. More specifically, in the homogeneous lean mode, relatively high robustness can be achieved only in some operational regions, and the robustness of the combustion is not high in the other operational regions including a low intake load factor region. Thus, in switching from the stoichiometric mode to the homogeneous lean mode, it is not preferable to simply shorten the waiting time from the time of switching of the operational state of the air flow control valve to the time of switching of the combustion mode. If the waiting time is too short, the combustion may be unstable depending on the operational region.

The present disclosure has been devised in view of the problems described above, and an object of the present disclosure is to provide an internal combustion engine that can quickly switch from a stoichiometric mode to a homogeneous lean mode while ensuring stable combustion.

An internal combustion engine according to the present disclosure is an internal combustion engine that can switch a combustion mode between a homogeneous lean mode, in which fuel combustion occurs at an air-fuel ratio leaner than a theoretical air-fuel ratio in a state where fuel and air are homogeneously mixed, and a stoichiometric mode, in which fuel combustion occurs at the theoretical air-fuel ratio, and the internal combustion engine is configured as described below.

The internal combustion engine includes an air flow control valve that is provided on an intake channel and controls the strength of an air flow produced in a combustion chamber by adjusting the opening angle of the valve, and a controller that operates at least the air flow control valve. More specifically, in a case of selecting the homogeneous lean mode as the combustion mode, the controller switches the opening angle of the air flow control valve in response to selection of the combustion mode so as to produce a stronger air flow in the combustion chamber than in a case where the stoichiometric mode is selected as the combustion mode. In a case of switching the combustion mode from the stoichiometric mode to the homogeneous lean mode, the controller starts switching of the combustion mode after switching of the opening angle of the air flow control valve is started. Furthermore, in a case where, in switching of the combustion mode from the stoichiometric mode to the homogeneous lean mode, a target operating point of the internal combustion engine lies outside a predetermined operational region, the controller sets a waiting time from the start of switching of the opening angle of the air flow valve to the start of switching of the combustion mode to be longer than in a case where the target operating point lies in the predetermined operational region. The "predetermined operational region" referred to here is a region that is set in a range that excludes a low intake load factor region and includes at least a medium intake load factor and medium engine speed region of operational regions of the internal combustion engine defined by an engine speed and an intake load factor. More specifically, the predetermined region is a region in which a combustion limit air-fuel ratio, which is a limit value on a fuel lean side of a range of the air-fuel ratio in which stable combustion is achieved, is greater than the air-fuel ratio in the low intake load factor region.

The robustness of the combustion is lower in the homogeneous lean mode than in the stoichiometric mode, and the turbulence of the air flow in the combustion chamber and the state of mixture of the fuel and air have a great effect on the stability of the combustion. The turbulence of the air flow in the combustion chamber and the mixing of the fuel and air are promoted by producing a strong air flow in the combustion chamber by closing the air flow control valve, and the degree of the promotion depends on the time elapsed since switching of the opening angle of the air flow control valve is started. Thus, the controller starts switching the combustion mode from the stoichiometric mode to the homogeneous lean mode after the waiting time has elapsed since the switching of the opening angle of the air flow valve is started. The waiting time is a time required for a turbulence of the air flow to occur and for mixing of the fuel and air to proceed to a degree that the combustion mode can be switched while maintaining stable combustion, and the length of the waiting time depends on the operational region in which the target operating point of the internal combustion engine lies. In the homogeneous lean mode, the robustness of the combustion is not high in the low intake load factor region of the operational regions of the internal combustion engine but is relatively high in the medium intake load factor and medium engine speed region. With the internal combustion engine configured as described above, when the target operating point of the internal combustion engine lies outside the predetermined operational region that is set in a range that excludes the low intake load factor region and includes at least the medium intake load factor and medium engine speed region, the waiting time is set to be longer than when the target operating point lies in the predetermined operational region. As a result, when shifting to the predetermined operational region in which the robustness of the combustion is relatively high, the waiting time can be reduced so that the combustion mode can be quickly switched from the stoichiometric mode to the homogeneous lean mode, and when shifting to a region outside of the predetermined operational region in which the robustness of the combustion is relatively low, the waiting time can be increased to give a higher priority to the stability of the combustion.

In a case where the difference between the intake load factor at a current operating point and the intake load factor at the target operating point is equal to or greater than a predetermined value in switching of the combustion mode from the stoichiometric mode to the homogeneous lean mode, the controller may set the waiting time from the start of switching of the opening angle of the air flow control valve to the start of switching of the combustion mode to be longer than in a case where the difference in the intake load factor is smaller than the predetermined value. This is because unstable combustion is likely to occur in a transient state in which the intake load factor significantly varies. As a result, stable combustion can be ensured in the transient state in which the intake load factor significantly varies, and the combustion mode can be quickly switched from the stoichiometric mode to the homogeneous lean mode when the variation of the intake load factor is small, and the combustion is relatively stable.

In the switching from the stoichiometric mode to the homogeneous lean mode, an overshoot of the air-fuel ratio, in which the air-fuel ratio becomes leaner than a control target air-fuel ratio in the homogeneous lean mode, can occur. The overshoot of the air-fuel ratio tends to be more marked when the overshoot occurs concurrently with the variation of the air-fuel ratio caused by switching of the opening angle of the air flow control valve. In general, the control target air-fuel ratio in the homogeneous lean mode is set with a certain margin with respect to the combustion limit air-fuel ratio (a limit value on the fuel lean side of the range of the air-fuel ratio in which stable combustion is achieved), so that the possibility that the air-fuel ratio becomes leaner than the combustion limit air-fuel ratio is low as far as the combustion limit air-fuel ratio is kept constant or approximately constant before and after the switching. However, if the combustion limit air-fuel ratio significantly differs between before and after the switching of the combustion mode, the possibility that the air-fuel ratio at least temporarily becomes leaner than the combustion limit air-fuel ratio is high when a significant overshoot of the air-fuel ratio occurs.

Thus, in a case where the difference between a value of the combustion limit air-fuel ratio at the target operating point and a value at the current operating point is great in switching of the combustion mode from the stoichiometric mode to the homogeneous lean mode, the controller may set the waiting time from the start of switching of the opening angle of the air flow control valve to the start of switching of the combustion mode to be longer than in a case where the difference is small. As a result, the greater the difference of the combustion limit air-fuel ratio between before and after the switching, the longer the waiting time is, and the overshoot of the air-fuel ratio caused by the switching of the combustion mode and the variation of the air-fuel ratio caused by the switching of the opening angle of the air flow control valve can be prevented from concurrently occurring.

Furthermore, in the switching of the combustion mode from the stoichiometric mode to the homogeneous lean mode, if a predetermined condition is satisfied, the controller may delay the start of switching of the opening angle of the air flow control valve with respect to the start of switching of the combustion mode. The predetermined condition is that the intake load factor increases between the current operating point and the target operating point, the target operating point lies in the predetermined operational region, and the deviation between the value of the combustion limit air-fuel ratio at the target operating point and the value of the combustion limit air-fuel ratio at the current operating point is equal to or smaller than a predetermined value. That is, under a condition where stable combustion is achieved, the intake efficiency can be kept high by delaying the start of the switching of the opening angle of the air flow control valve. As a result, the intake load factor can be quickly increased, and thus, the air-fuel ratio can more quickly reach the control target air-fuel ratio.

The predetermined operational region described above (the region in which the waiting time from the start of the switching of the opening angle of the air flow control valve to the start of the switching of the combustion mode is set to be relatively short) may be defined as a set of operating points at which the margin of the combustion limit air-fuel ratio with respect to the control target air-fuel ratio in the homogeneous lean mode is equal to or greater than a predetermined value. If the margin between the combustion limit air-fuel ratio and the control target air-fuel ratio is wide, the possibility that the air-fuel ratio exceeds the combustion limit air-fuel ratio is low even if the air-fuel ratio varies to some extent when the combustion mode is switched from the stoichiometric mode to the homogeneous lean mode. Thus, by designating the region in which the margin is relative wide as the predetermined operational region and setting different waiting times in and outside of the region, both stable combustion and quick switching of the combustion mode from the stoichiometric mode to the homogeneous lean mode can be achieved.

Furthermore, in a case of switching the combustion mode from the homogeneous lean mode to the stoichiometric mode, the controller may start switching of the opening angle of the air flow control valve after switching of the combustion mode is started. Furthermore, in a case where, in switching of the combustion mode from the homogeneous lean mode to the stoichiometric mode, the current operating point of the internal combustion engine lies outside the predetermined operational region, the controller may set the waiting time from the start of switching of the combustion mode to the start of switching of the opening angle of the air flow valve to be longer than in a case where the current operating point lies in the predetermined operational region.

In the case of switching the combustion mode from the homogeneous lean mode to the stoichiometric mode, the robustness of the combustion is kept lower while the air-fuel ratio is varying than in the stoichiometric mode. Thus, it is desirable to keep the in-cylinder state suitable for the homogeneous lean mode for a certain time after the switching of the combustion mode is started. Thus, the switching of the opening angle of the air flow control valve is started after the waiting time has elapsed since the switching of the combustion mode from the homogeneous lean mode to the stoichiometric mode is started. The waiting time is a time required for the air-fuel ratio comes close to the theoretical air-fuel ratio to a degree that the opening angle of the air flow control valve can be switched while maintaining stable combustion, and the length of the waiting time depends on the operational region in which the target operating point of the internal combustion engine lies. With the internal combustion engine configured as described above, when shifting from the predetermined operational region in which the robustness of the combustion is relatively high, the waiting time can be reduced so that the intake efficiency can be improved by quick switching of the opening angle of the air flow control valve, and when shifting from a region outside of the predetermined operational region in which the robustness of the combustion is relatively low, the waiting time can be increased to give a higher priority to the stability of the combustion.

Furthermore, in a case where the difference between the intake load factor at the current operating point and the intake load factor at the target operating point is equal to or greater than a predetermined value in switching of the combustion mode from the homogeneous lean mode to the stoichiometric mode, the controller may set the waiting time from the start of switching of the combustion mode to the start of switching of the opening angle of the air flow control valve to be longer than in a case where the difference in the intake load factor is smaller than the predetermined value. This is because unstable combustion is likely to occur in a transient state in which the intake load factor significantly varies. As a result, stable combustion can be ensured in the transient state in which the intake load factor significantly varies, and the opening angle of the air flow control valve can be quickly switched to improve the intake efficiency when the variation of the intake load factor is small, and the combustion is relatively stable.

The air-fuel ratio can at least temporarily becomes leaner than the control target air-fuel ratio in the homogeneous lean mode in the process of switching the combustion mode from the homogeneous lean mode to the stoichiometric mode. This phenomenon tends to be marked if the variation of the air-fuel ratio caused by the switching of the opening angle of the air flow control valve occurs concurrently. In particular, if the combustion limit air-fuel ratio significantly differs between before and after the switching of the combustion mode, the air-fuel ratio is likely to at least temporarily become leaner than the combustion limit air-fuel ratio when the air-fuel ratio significantly varies.

Thus, in a case where the difference between a value of the combustion limit air-fuel ratio at the target operating point and a value at the current operating point is great in switching of the combustion mode from the homogeneous lean mode to the stoichiometric mode, the controller may set the waiting time from the start of switching of the combustion mode to the start of switching of the opening angle of the air flow control valve to be longer than in a case where the difference is small. As a result, the greater the difference of the combustion limit air-fuel ratio between before and after the switching, the longer the waiting time is, and the variation of the air-fuel ratio at the time of switching of the combustion mode is suppressed.

As described above, the internal combustion engine according to the present disclosure sets the waiting time from the start of switching of the opening angle of the air flow control valve to the start of switching of the combustion mode to be longer in the case where the target operating point of the internal combustion engine lies outside of the predetermined operational region than in the case where the target operating point lies in the predetermined operational region, and thus, the internal combustion engine can quickly switch the combustion mode from the stoichiometric mode to the homogeneous lean mode while ensuring stable combustion.

DETAILED DESCRIPTION

In the following, embodiments of the present disclosure will be described with reference to the drawings. Any mention of a numerical value such as the number, quantity, amount or range of an entity in the embodiments described below is not intended to limit the present disclosure to the numerical value unless otherwise specified or unless it is obvious that the numerical value is identified in principle. In addition, any structure, step or the like described in the embodiments is not essential for the present disclosure unless otherwise specified or unless it is obvious that the structure, step or the like is identified in principle.

1. Summary of Configuration of Internal Combustion Engine

Figure 1:
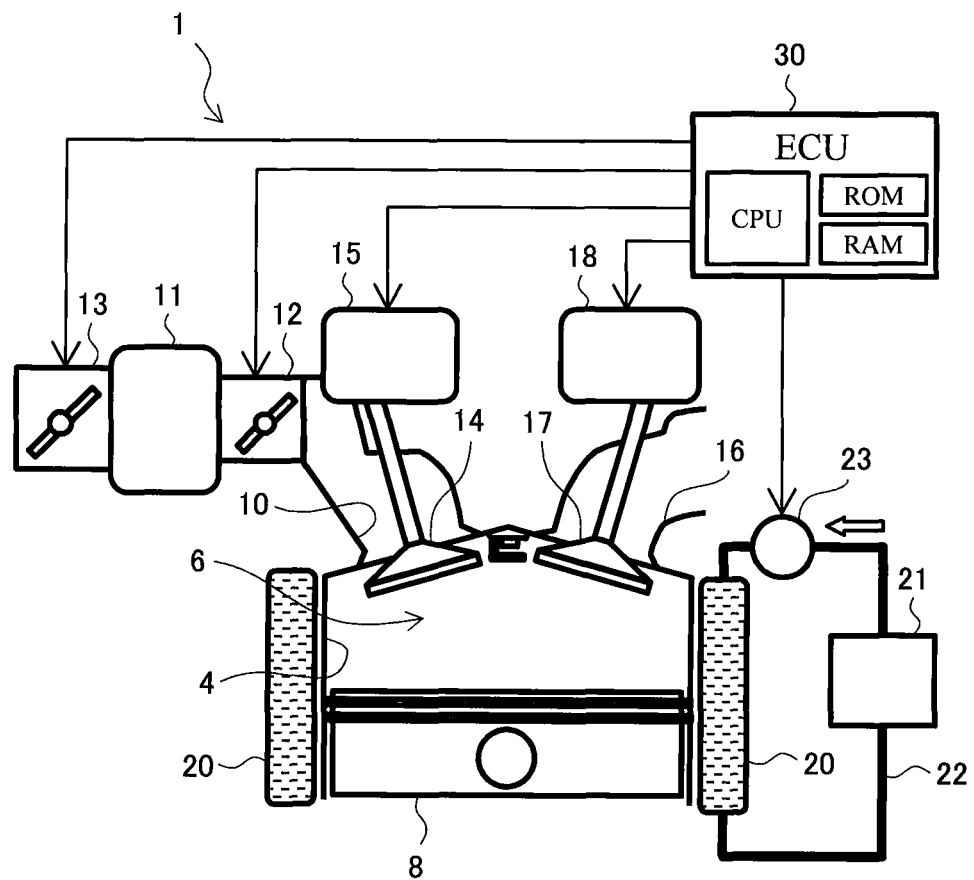
FIG. 1 is a diagram schematically showing a configuration of an internal combustion engine according to the present disclosure.

FIG. 1 is a diagram schematically showing a configuration of an internal combustion engine according to the present disclosure. FIG. 1 shows components of an internal combustion engine 1 (referred to simply as an engine hereinafter) projected to a plane perpendicular to a crankshaft. The engine 1 is a spark ignition multi-cylinder engine with a plurality of cylinders 4. The number and arrangement of the cylinders 4 are not particularly limited. The cylinder 4 contains a piston 8 that reciprocates in the axial direction of the cylinder 4. In an engine head (not shown), a combustion chamber 6 having a pent roof-like shape, which forms an upper space in the cylinder 4, is formed.

An intake port 10 and an exhaust port 16 are connected to the combustion chamber 6. An intake valve 14 is provided at an opening of the intake port 10 into the combustion chamber 6. The intake valve 14 is driven by an intake variable valve device 15 that can continuously change the valve timing of the intake valve 14 and switch a driving cam between a large working angle cam and a small working angle cam. An exhaust valve 17 is provided at an opening of the exhaust port 16 into the combustion chamber 6. The exhaust valve 17 is driven by an exhaust variable valve device 18 that can continuously change the valve timing of the exhaust valve 17 and switch a driving cam between a large working angle cam and a small working angle cam.

An intake manifold 11 is connected to the intake port 10, and the intake manifold distributes air among cylinders after the flow rate of the air is adjusted by a throttle 13. Each branch pipe of the intake manifold 11 is provided with a tumble control valve 12, which serves as an air flow control valve. The strength of the tumble flow that occurs in the combustion chamber 6 can be increased by reducing the opening angle of the tumble control valve 12, and the effective cross-sectional area of the flow channel and thus the intake efficiency can be increased by increasing the opening angle of the tumble control valve 12. In this embodiment, the opening angle of the tumble control valve 12 is adjusted in two steps: open and close. As a specific index of the strength of the tumble flow, a tumble ratio is used. The tumble ratio is defined as the number of revolutions of the tumble flow in the combustion chamber 6 in a time required for one reciprocation of the piston 8.

A water jacket 20 in which cooling water flows is provided surrounding the cylinder 4. The cooling water is circulated in a cooling water circulation circuit 22 that connects the water jacket 20 and a radiator 21 to each other. The temperature of the cooling water can be adjusted by an electronic thermostat 23 provided on the cooling water circulation circuit 22.

Although not shown, the engine 1 is provided with a port injection valve that injects fuel into the intake port 10 and an in-cylinder injection valve that injects fuel directly into the combustion chamber 6. The engine 1 can switch between an operation in a homogeneous lean mode and an operation in a stoichiometric mode. In the homogeneous lean mode, the engine operates at a lean air-fuel ratio (an air-fuel ratio of approximately 25, for example) relying on the port injection that provides a highly homogeneous air-fuel mixture or a combination of the port injection as a primary injection and the in-cylinder injection as a secondary injection. The lean combustion in the engine 1 is not a stratified lean combustion in which a layer of an air-fuel mixture with a high fuel concentration is formed around an ignition plug but a homogeneous lean combustion in which an air-fuel mixture with a homogeneous fuel concentration is distributed in the whole of the combustion chamber 6. In the stoichiometric mode, the engine operates at the theoretical air-fuel ratio, that is, in the stoichiometric combustion mode relying on the in-cylinder injection or a combination of the in-cylinder injection as a primary injection and the port injection as a secondary injection.

Devices and actuators that provide the homogeneous lean mode and the stoichiometric mode are operated by a controller 30. The controller 30 controls the operation of the engine 1 by operating various devices and actuators of the engine 1. The controller 30 is an electronic control unit (ECU) that includes at least one CPU, at least one ROM, and at least one RAM. The controller 30 may be constituted by a plurality of ECUs. The controller 30 loads a program from the ROM to the RAM and makes the CPU execute the program to provide various functions involved with engine control.

2. Engine Control in Response to Combustion Mode

Figure 2:
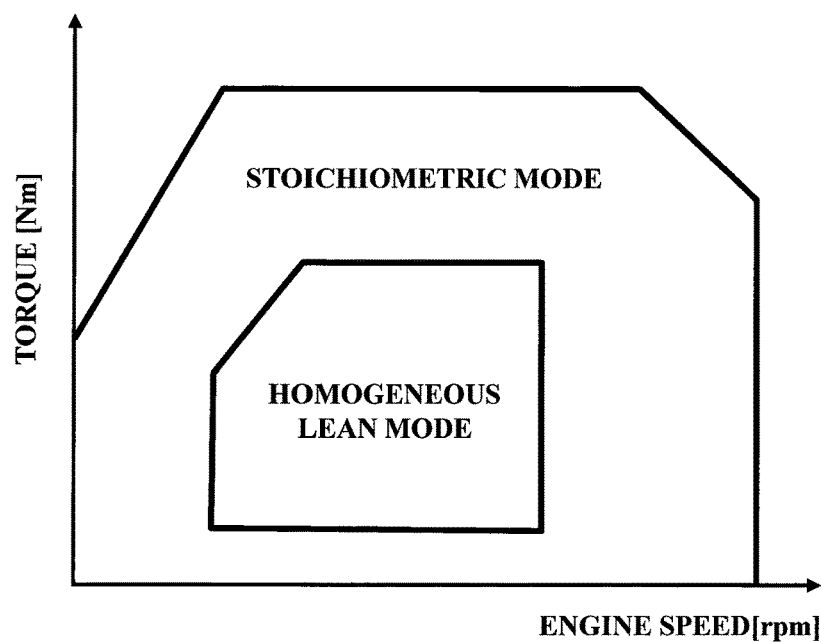
FIG. 2 is a diagram showing a setting of combustion modes on an operational region defined by a torque and an engine speed.

FIG. 2 is a diagram showing a relationship between the torque and the engine speed of the engine 1 in different combustion modes of the engine 1 selected by the controller 30. As shown in this drawing, the stoichiometric mode is selected in a low engine speed region, a high engine speed region, a low torque region and a high torque region, and the homogeneous lean mode is selected in a medium torque and medium engine speed region. The terms "low", "medium" and "high" used herein to express the magnitude of the engine speed, the torque, the intake load factor and the like mean the relative magnitude in the operational region of the engine 1 and does not mean the absolute magnitude.

In response to the combustion mode selected, the controller 30 performs an air amount control based on operation of the throttle 13, a fuel injection control based on operation of a fuel injection device (not shown, including the port injection valve and the in-cylinder injection valve), and an ignition control based on operation of an ignition device (not shown, including the ignition plug). The air amount control involves calculating a control target intake load factor from a control target torque and a control target air-fuel ratio and calculating the opening angle of the throttle 13 that achieves the control target intake load factor by using a physical mode. The fuel injection control involves estimating the air amount in the combustion chamber 6 by using a physical model that has, as parameters, operational states of actuators involved with air intake including the throttle 13 and the tumble control valve 12. A total fuel injection amount is calculated from the estimated air amount and the control target air-fuel ratio, and the fuel injection amount for each injection valve is calculated from a share ratio of each injection valve determined by the combustion mode and the total fuel injection amount. The ignition control involves determining an ignition timing from the control target intake load factor, the control target air-fuel ratio and the like.

The air amount, the fuel injection amount of each injection valve, and the ignition timing are fundamental operation quantities that determine the combustion state. Even at the same torque and the same engine speed, appropriate values of the operation quantities vary between when the engine operates in the stoichiometric combustion mode and when the engine operates in the homogeneous lean combustion mode. Thus, switching from the stoichiometric mode to the homogeneous lean mode is achieved by changing each of the air amount, the fuel injection amount and the ignition timing from an appropriate value for the stoichiometric mode to an appropriate value for the homogeneous lean mode. Similarly, switching from the homogeneous lean mode to the stoichiometric mode is achieved by changing each of the operation quantities from an appropriate value for the homogeneous lean mode to an appropriate value for the stoichiometric mode. The switching of the combustion mode referred to herein means making each of the air amount control, the fuel injection control and the ignition control suitable for the selected combustion mode.

The controller 30 changes settings of operation quantities of at least the tumble control valve 12, the intake variable valve device 15, the exhaust variable valve device 18 and the electronic thermostat 23 in response to the switching of the combustion mode as a result of change of the operation quantities described above. This is because these operation quantities have a direct or indirect effect on the combustion state in each combustion mode. More specifically, in operation of the tumble control valve 12, in the homogeneous lean mode, the tumble control valve 12 is closed to produce a strong tumble flow in the combustion chamber 6. This is intended not only to increase the turbulence of the air flow in the combustion chamber 6 but also to promote mixing of the fuel and air. In the stoichiometric mode, the tumble control valve 12 is opened to increase the effective cross-sectional area of the flow channel and thus increase the intake efficiency. In operation of the intake variable valve device 15, in the stoichiometric mode, the valve timing is relatively advanced, and the large working angle cam is used, and in the homogeneous lean mode, the valve timing is relatively delayed, and the small working angle cam is used. In operation of the exhaust variable valve device 18, in the stoichiometric mode, the valve timing is relatively delayed, and the large working angle cam is used, and in the homogeneous lean mode, the valve timing is relatively advanced, and the small working angle cam is used. In operation of the electronic thermostat 23, in the stoichiometric mode, the electronic thermostat 23 is opened to relatively reduce the engine water temperature to suppress occurrence of a knocking, and in the homogeneous lean mode, the electronic thermostat 23 is closed to relatively increase the engine water temperature to increase the in-cylinder temperature and thereby promote vaporization of the fuel.

3. Summary of Switching Control of Combustion Mode

From the viewpoint of the fuel economy and the operation performance, switching of the combustion mode is preferably immediately performed when the target operating point of the engine 1 is moved. In this respect, however, it has to be noted that the switching be performed while ensuring stable combustion. If an unstable combustion causes a misfire, the misfire causes not only significant deterioration of the exhaust gas emission performance but also deterioration of the fuel economy and the operation performance.

The unstable combustion that occurs during switching of the combustion mode is caused by the air-fuel ratio temporarily exceeding a combustion limit air-fuel ratio while the air-fuel ratio is changed from the control target air-fuel ratio for the stoichiometric mode to the control target air-fuel ratio for the homogeneous lean mode or while the air-fuel ratio is changed from the control target air-fuel ratio for the homogeneous lean mode to the control target air-fuel ratio for the stoichiometric mode. The combustion limit air-fuel ratio is a limit value on the fuel lean side of the range of the air-fuel ratio in which stable combustion can be achieved, and depends on the intake load factor. A cause of the variation of the air-fuel ratio is deterioration of the precision of the estimation of the air amount based on the physical model. The physical model used for estimating the air amount in the fuel injection control (referred to as an air model) is designed for a steady state. Thus, in a transient state in which the opening angle of the throttle significantly varies, such as during switching of the combustion mode, it is difficult to estimate the air amount with high precision. Since the fuel injection amount is determined based on the estimated air amount, if the estimated air amount deviates from the actual air amount, the control target air-fuel ratio also deviates from the actual air-fuel ratio.

Figure 3:
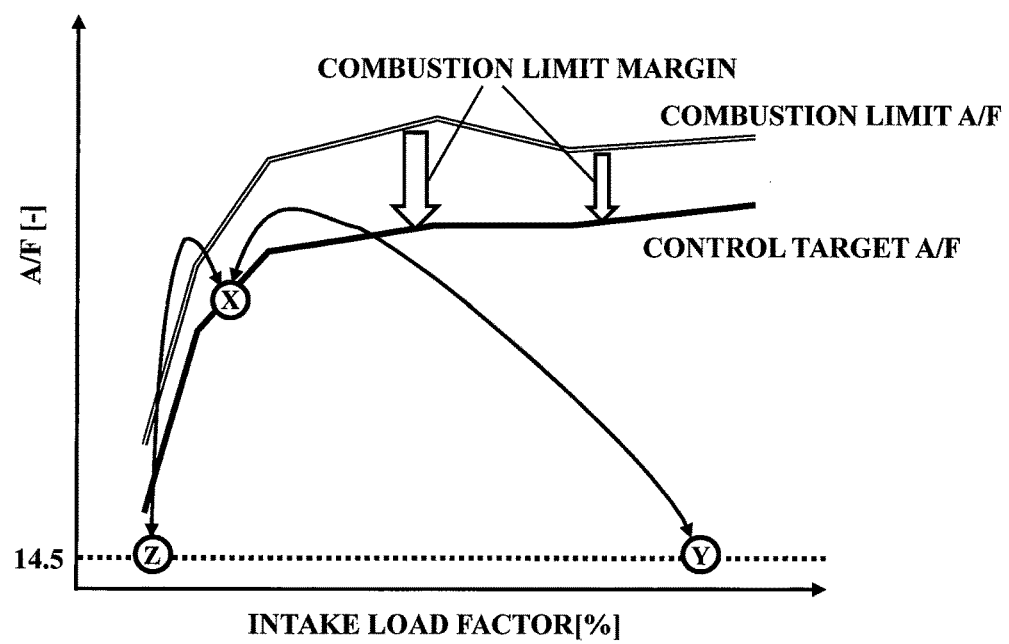
FIG. 3 is a diagram showing a relation between a combustion limit air-fuel ratio, a control target air-fuel ratio and an intake load factor.

In FIG. 3, the double line shows a variation of the combustion limit air-fuel ratio (denoted as combustion limit A/F in the drawing) with respect to the intake load factor in the case where the engine speed is constant. In a region where the intake load factor is low, the combustion limit air-fuel ratio significantly varies with respect to the intake load factor, and rapidly increases as the intake load factor increases. In a region where the intake load factor is medium, the combustion limit air-fuel ratio slowly varies with respect to the intake load factor and is kept high. In a region where the intake load factor is high, the combustion limit air-fuel ratio temporarily decreases as the intake load factor increases and, as a result, the combustion limit air-fuel ratio is slightly lower than the intake load factor in the region where the intake load factor is medium.

For the combustion limit air-fuel ratio that varies with respect to the intake load factor as described above, the control target air-fuel ratio in the homogeneous lean mode is set with a certain margin. In FIG. 3, the solid line shows a variation of the control target air-fuel ratio (denoted as control target A/F in the drawing) in the homogeneous lean mode with respect to the intake load factor in the case where the engine speed is constant. In the following description, the term "control target air-fuel ratio" means the control target air-fuel ratio in the homogeneous lean mode unless otherwise specified. Whereas the combustion limit air-fuel ratio varies with the intake load factor, the variation of the control target air-fuel ratio is reduced in the region where the intake load factor is medium and the region where the intake load factor is high. This is intended to prevent the control target air-fuel ratio from abruptly varying when the intake load factor varies. Thus, the margin of the control target air-fuel ratio with respect to the combustion limit air-fuel ratio is not uniform. Although the margin is wide in the region where the intake load factor is medium, the margin is narrow in the region where the intake load factor is low and the region where the intake load factor is high.

Figures 4, 5:
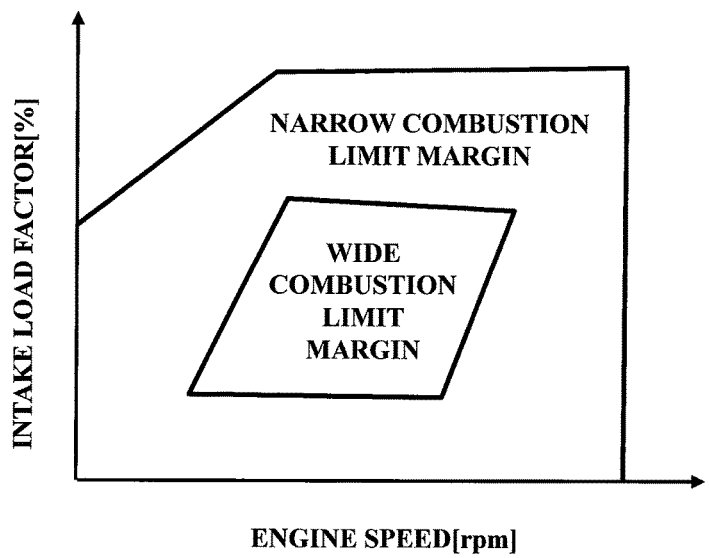
FIG. 4 is a diagram showing an operational region defined by the intake load factor and the engine speed, the operational region being divided into a region where the margin of the control target air-fuel ratio with respect to the combustion limit air-fuel ratio is wide and a region where the margin is narrow.
FIG. 5 is a table showing a relationship among the margin of the control target air-fuel ratio with respect to the combustion limit air-fuel ratio, the variation of the combustion limit air-fuel ratio, and the robustness of the combustion.

A relationship similar to the relationship between the combustion limit margin and the control target air-fuel ratio for the intake load factor described above also exists for the engine speed. That is, the margin of the control target air-fuel ratio with respect to the combustion limit air-fuel ratio is not uniform with respect to the engine speed. Although the margin is wide in a region where the engine speed is medium, the margin is narrow in the region where the engine speed is low and the region where the engine speed is high. FIG. 4 shows the operational region of the engine 1 defined in a coordinate system in a two-dimensional plane whose coordinate axes show the intake load factor and the engine speed, the operational region being divided into a region where the margin of the control target air-fuel ratio with respect to the combustion limit air-fuel ratio is wide and a region where the margin is narrow. In the following description, the region where the margin of the control target air-fuel ratio with respect to the combustion limit air-fuel ratio is wide is referred to as a wide combustion limit margin region, and the region where the control target air-fuel ratio with respect to the combustion limit air-fuel ratio is narrow is referred to as a narrow combustion limit margin region.

The divisions of the operational region in FIG. 4 are shown only for the illustrative purposes, and the wide combustion limit margin region in the operational region varies depending on the specifications of the engine 1. However, substantially all common engines capable of operating in the homogeneous lean mode have a common engine characteristic that a low intake load factor region is part of the narrow combustion limit margin region, and a medium intake load factor and medium engine speed region is part of the wide combustion limit margin region. That is, the wide combustion limit margin region is set in a range that excludes at least the low intake load factor region and includes at least the medium intake load factor and medium engine speed region.

Referring back to FIG. 3, an effect of the combustion limit air-fuel ratio on the robustness of the combustion during switching of the combustion mode will be described. FIG. 3 shows an illustrative trajectory of the air-fuel ratio that varies when the combustion mode is switched as the intake load factor varies. In FIG. 3, the movement from an operating point Y to an operating point X shows a switching from an operation in the stoichiometric mode in the region where the intake load factor is high to an operation in the homogeneous lean mode in the region where the intake load factor is low. The movement from an operating point Z to the operating point X shows a switching from an operation in the stoichiometric mode in the region where the intake load factor is low to an operation in the homogeneous lean mode in the region where the intake load factor is low.

As shown by the trajectory of the variation of the air-fuel ratio, in the switching from the stoichiometric mode to the homogeneous lean mode, an overshoot of the air-fuel ratio, in which the air-fuel ratio becomes leaner than the control target air-fuel ratio in the homogeneous lean mode, can occur due to an error of the estimation of the air amount used in the calculation of the fuel injection amount. Of course, the possibility that the overshoot occurs and the air-fuel ratio becomes leaner than the combustion limit air-fuel ratio becomes higher as the margin of the control target air-fuel ratio with respect to the combustion limit air-fuel ratio at the target operating point becomes narrower. That is, the robustness of the combustion is lower when the margin of the control target air-fuel ratio with respect to the combustion limit air-fuel ratio is narrow than when the margin is wide.

In addition, even for the same margin of the control target air-fuel ratio with respect to the combustion limit air-fuel ratio at the target operating point, the possibility that the air-fuel ratio becomes leaner than the combustion limit air-fuel ratio is higher when the difference in the combustion limit air-fuel ratio between before and after the switching of the combustion mode is great than when the difference is small. Referring to FIG. 3, although the air-fuel ratio does not exceed the combustion limit air-fuel ratio in the movement from the point Y to the point X in which the combustion limit air-fuel ratio does not significantly vary, the air-fuel ratio temporarily exceeds the combustion limit air-fuel ratio in the movement from the point Z to the point X in which the combustion limit air-fuel ratio significantly varies. That is, the robustness of the combustion is lower when the combustion limit air-fuel ratio significantly varies than when the combustion limit air-fuel ratio does not significantly vary.

The trajectory of the variation of the air-fuel ratio during switching of the combustion mode shown in FIG. 3 holds true for switching from the homogeneous lean mode to the stoichiometric mode. That is, because of the effect of the error of the estimation of the air amount used in the calculation of the fuel injection amount, the air-fuel ratio does not always monotonically become richer from the control target air-fuel ratio in the homogeneous lean mode to the theoretical air-fuel ratio. For example, as shown by the trajectory from the operating point X to the operating point Y, the air-fuel ratio can temporarily become leaner than the control target air-fuel ratio in the homogeneous lean mode. If the margin of the control target air-fuel ratio with respect to the combustion limit air-fuel ratio at the operating point X is narrow, the air-fuel ratio can become leaner than the combustion limit air-fuel ratio. Furthermore, if the combustion limit air-fuel ratio significantly differs between before and after the switching of the combustion mode, the air-fuel ratio can become leaner than the combustion limit air-fuel ratio, as shown by the trajectory from the operating point X to the operating point Z.

As can be seen from the above description, the robustness of the combustion during switching of the combustion mode depending on whether the margin of the control target air-fuel ratio with respect to the combustion limit air-fuel ratio is wide or narrow and whether the difference in the combustion limit air-fuel ratio between before and after the switching of the combustion mode is great or small. FIG. 5 is a table showing a relationship among the margin of the control target air-fuel ratio with respect to the combustion limit air-fuel ratio, the variation of the combustion limit air-fuel ratio, and the robustness of the combustion. In this table, the "combustion limit margin is wide" means that the target operating point lies in the wide combustion limit margin region shown in FIG. 4 in the switching from the stoichiometric mode to the homogeneous lean mode and means that the current operating point lies in the wide combustion limit margin region shown in FIG. 4 in the switching from the homogeneous lean mode to the stoichiometric mode. Similarly, the "combustion limit margin is narrow" means the target operating point lies in the narrow combustion limit margin region shown in FIG. 4 in the switching from the stoichiometric mode to the homogeneous lean mode and means that the current operating point lies in the narrow combustion limit margin region shown in FIG. 4 in the switching from the homogeneous lean mode to the stoichiometric mode. The "combustion limit A/F variation is great" means that the difference in the combustion limit air-fuel ratio between before and after the switching from the stoichiometric mode to the homogeneous lean mode or the switching from the homogeneous lean mode to the stoichiometric mode is relatively great. Similarly, the "combustion limit A/F variation is small" means that the difference in the combustion limit air-fuel ratio between before and after the switching from the stoichiometric mode to the homogeneous lean mode or the switching from the homogeneous lean mode to the stoichiometric mode is relatively small.

As shown in the table, the robustness of the combustion is high when the "combustion limit margin is wide" and the "combustion limit A/F variation is small". The robustness of the combustion is lower when the "combustion limit margin is narrow" and the "combustion limit A/F variation is great". The robustness of the combustion is medium when the "combustion limit margin is wide" and the "combustion limit A/F variation is great" and when the "combustion limit margin is narrow" and the "combustion limit A/F variation is small". The level of the robustness of the combustion shown here is a condition on the engine control involved with the switching of the combustion mode, and it is required to achieve both stable combustion and quick switching of the combustion mode under this condition.

4. Setting of Waiting Time

As described above, settings of the operation quantities of the actuators such as the tumble control valve 12 are changed when the combustion mode is switched. The robustness of the combustion is lower in the homogeneous lean mode than in the stoichiometric mode, and the state of mixture of the fuel and air has a great effect on the stability of the combustion. Mixing of the fuel and air is promoted by closing the tumble control valve 12 to produce a strong air flow in the combustion chamber 6, and the degree of the promotion of the mixing depends on the time that has elapsed since the tumble control valve 12 is closed. In addition, the overshoot of the air-fuel ratio, in which the air-fuel ratio becomes leaner than the control target air-fuel ratio in the homogeneous lean mode, tends to be more marked when the overshoot occurs concurrently with the variation of the air-fuel ratio caused by switching of the opening angle of the tumble control valve 12. Thus, when switching the combustion mode from the stoichiometric mode to the homogeneous lean mode, switching of the opening angle of the tumble control valve 12 is first started, and switching of the combustion mode is then started after a certain time as required.

If it is desirable to make the in-cylinder state at the time of start of the switching of the combustion mode more stable, the waiting time from the start of the switching of the opening angle of the tumble control valve 12 to the start of the switching of the combustion mode is preferably long. However, as the waiting time increases, the fuel economy and the operation performance deteriorate due to the delay of the switching of the combustion mode. In view of this, the level of the robustness of the combustion during switching of the combustion mode shown in the table in FIG. 5 is used as an index for setting the waiting time. If the robustness of the combustion is low, the waiting time needs to be increased, the waiting time before the in-cylinder state is stabilized needs to be increased. To the contrary, if the robustness of the combustion is high, switching of the combustion mode can be started without waiting for the in-cylinder state to be stabilized. Although the table of FIG. 5 shows four cases, the robustness of the combustion may be evaluated in more cases.

When switching the combustion mode from the stoichiometric mode to the homogeneous lean mode, the controller 30 determines the waiting time described above by using a map that uses the intake load factor, the engine speed and the variation of the combustion limit air-fuel ratio as parameters. The intake load factor and the engine speed are used to determine whether the target operating point of the engine 1 lies in the wide combustion limit margin region or the narrow combustion limit margin region. The variation of the combustion limit air-fuel ratio is calculated as the difference between the value of the combustion limit air-fuel ratio at the current operating point and the value of the combustion limit air-fuel ratio at the target operating point. The combustion limit air-fuel ratio is defined in association with the intake load factor and in association with the engine speed in another map.

Figure 6:
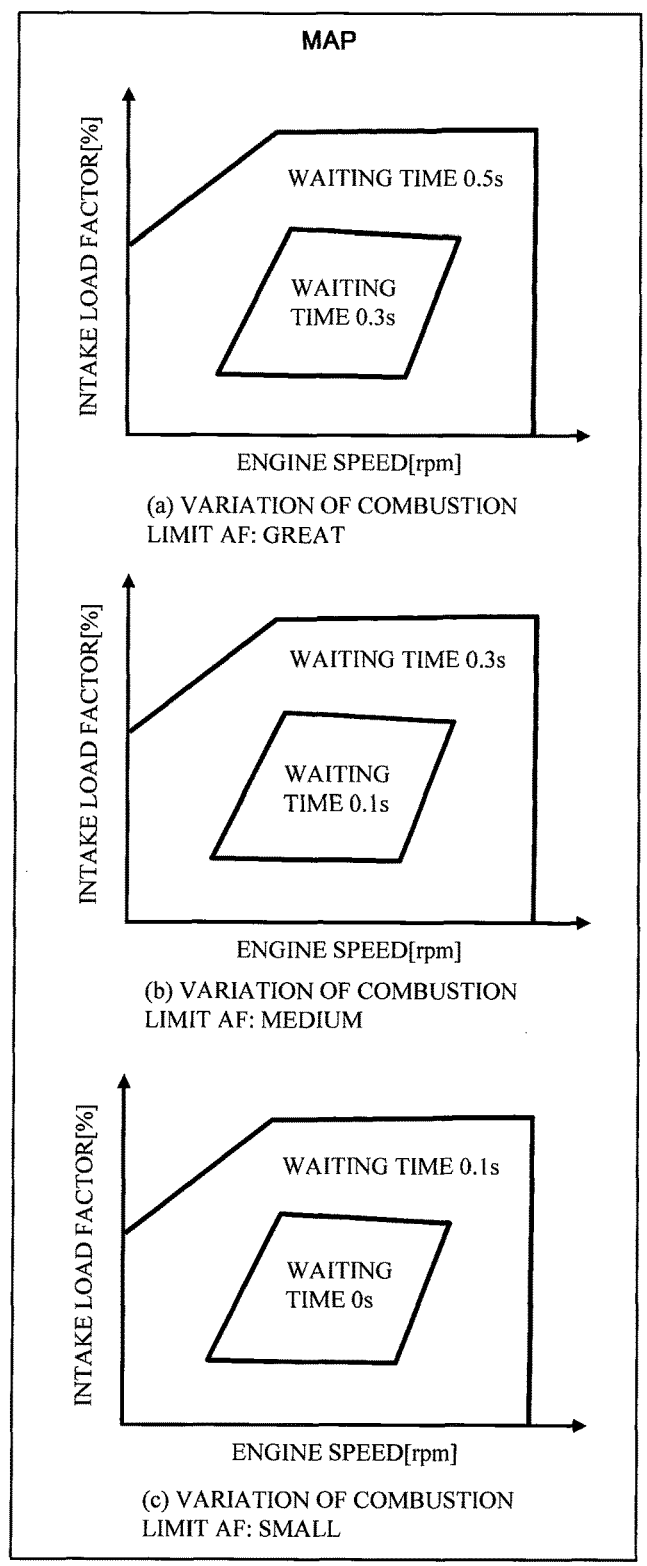
FIG. 6 is a diagram showing configurations of maps used in setting of a waiting time for the intake load factor, the engine speed and the variation of the combustion limit air-fuel ratio.

FIG. 6 is a diagram showing configurations of maps used in setting of the waiting time. The map used for setting of the waiting time is a three-dimensional map whose coordinate axes show the intake load factor, the engine speed and the variation of the combustion limit air-fuel ratio, and the variation of the combustion limit air-fuel ratio is classified as three levels: great, medium or small. In this example, the robustness of the combustion is divided into six cases, and the waiting time is set for each case. FIG. 6 shows a map (a) that shows a setting of the waiting time in the case where the variation of the combustion limit air-fuel ratio is great, a map (b) that shows a setting of the waiting time in the case where the variation of the combustion limit air-fuel ratio is medium, and a map (c) that shows a setting of the waiting time in the case where the variation of the combustion limit air-fuel ratio is small. For example, in the map (a), the waiting time is set at 0.3 seconds in the wide combustion limit margin region and at 0.5 seconds in the narrow combustion limit margin region. In the other maps (b) and (c), the waiting time is also set to be longer in the narrow combustion limit margin region than in the wide combustion limit margin region. As can be seen by comparison between the three maps (a), (b) and (c), the greater the variation of the combustion limit air-fuel ratio, the longer the waiting time is.

On the other hand, in switching from the homogeneous lean mode to the stoichiometric mode, the robustness of the combustion is lower when the air-fuel ratio is varying than when in the stoichiometric mode. To ensure the stable combustion under this condition, it is desirable to keep the in-cylinder state suitable for the homogeneous lean mode for a certain time after switching of the combustion mode is started. Furthermore, in the transient state in which the air-fuel ratio is changing from the homogeneous lean mode to the stoichiometric mode, the air-fuel ratio can exceed the combustion limit air-fuel ratio, and the possibility that the air-fuel ratio exceeds the combustion limit air-fuel ratio increases if a variation of the air-fuel ratio caused by switching of the opening angle of the tumble control valve 12 occurs concurrently. Thus, when switching the combustion mode from the homogeneous lean mode to the stoichiometric mode, the controller 30 first starts switching of the combustion mode and then starts switching of the opening angle of the tumble control valve 12 after a certain time as required.

If it is desirable to suppress the effect of the tumble control valve 12 on the in-cylinder after switching of the combustion mode is started, the waiting time from the start of the switching of the combustion mode to the start of the switching of the opening angle of the tumble control valve 12 is preferably long. However, as the waiting time increases, the timing of opening the tumble control valve 12 to increase the intake efficiency is delayed, so that the fuel economy and the operation performance deteriorate. Thus, as in the case of switching from the stoichiometric mode to the homogeneous lean mode, the waiting time is set by using as an index the level of the robustness of the combustion classified as shown in the table of FIG. 5. More specifically, when switching the combustion mode from the homogeneous lean mode to the stoichiometric mode, the controller 30 determines the waiting time by using a map that uses the intake load factor, the engine speed and the variation of the combustion limit air-fuel ratio as parameters. As in the case of switching from the stoichiometric mode to the homogeneous lean mode, configurations of maps used in setting of the waiting time are as shown in FIG. 6. That is, in the maps used in setting of the waiting time, the waiting time is set to be longer in the narrow combustion limit margin region than in the wide combustion limit margin region. In addition, the greater the variation of the combustion limit air-fuel ratio, the longer waiting time is set.

5. Control Flow of Combustion Mode Switching Control

A combustion mode switching control is performed based on the waiting time set as described above. In the following, a control flow for the controller 30 to perform the combustion mode switching control will be described, and some illustrative operations of the engine 1 provided by the control flow will be shown.

Figure 7:
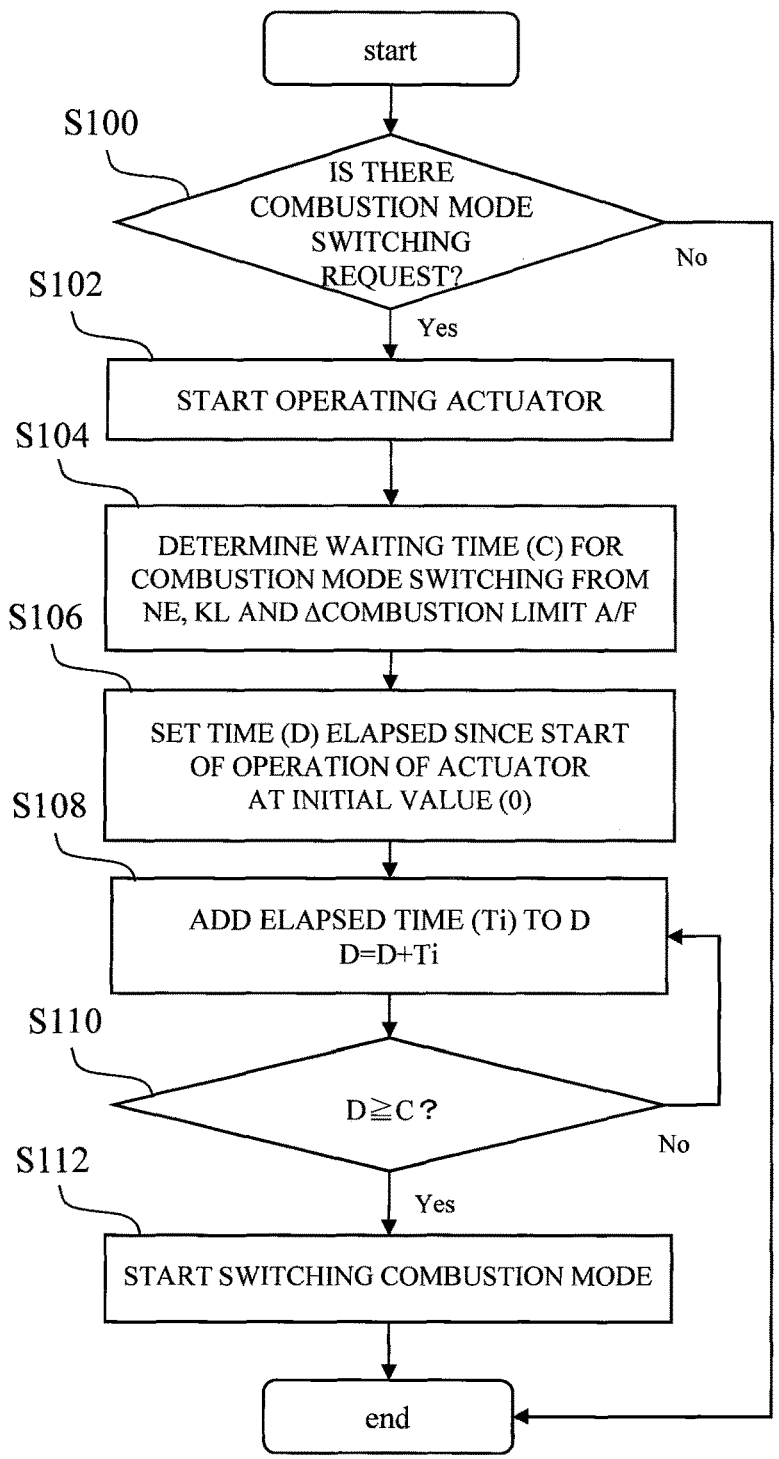
FIG. 7 is a flowchart showing a control flow performed when switching the combustion mode from the stoichiometric mode to the homogeneous lean mode.

5-1. Control Flow in Switching from Stoichiometric Mode to Homogeneous Lean Mode FIG. 7 is a flowchart showing a control flow of a combustion mode switching control performed by the controller 30 when switching the combustion mode from the stoichiometric mode to the homogeneous lean mode. The controller 30 reads a program created based on the control flow from the ROM and executes the program.

First, in Step S100, the controller 30 determines whether or not there is a combustion mode switching request. This "combustion mode switching request" means a request for switching from the stoichiometric mode to the homogeneous lean mode. The controller 30 determines that there is a switching request if the target operating point of the engine 1 moves from an operational region in which the stoichiometric mode is selected to an operational region in which the homogeneous lean mode is selected in a coordinate system in a two-dimensional plane whose coordinate axes show the engine speed and the torque. If there is no switching request, the current control flow ends.

If there is a combustion mode switching request, the controller 30 performs the processing of Step S102. In Step S102, the controller 30 starts operating an actuator. The actuators include the tumble control valve 12, the intake variable valve device 15, the exhaust variable valve device 18, and the electronic thermostat 23. The "operation of an actuator" means an operation involved with changing the operation quantity of the actuator from a value suitable for the stoichiometric mode to a value suitable for the homogeneous lean mode. If the controller 30 starts operating the tumble control valve 12, for example, switching from the opening angle of the tumble control valve 12 from the open state to the closed state is started.

In Step S104, the controller 30 then determines a waiting time C before the combustion mode switching from the engine speed (NE), the intake load factor (KL), and the variation of the combustion limit air-fuel ratio (A combustion limit A/F). The waiting time C is determined by using the maps configured as shown in FIG. 6. In the coordinate system in the two-dimensional plane whose coordinate axes show the engine speed and the intake load factor, if the target operating point lies in the wide combustion limit margin region, the waiting time C is set to be relatively short, and if the target operating point lies in the narrow combustion limit margin region, the waiting time C is set to be relatively long. The waiting time C is set to be longer when the variation of the combustion limit air-fuel ratio is great than when the variation of the combustion limit air-fuel ratio is small.

In Step S106, the controller 30 then sets a parameter D, which shows the time elapsed since the operation of the actuator is started, at an initial value, 0.

In Step S108, the controller 30 then adds an elapsed time Ti after Step S108 of the previous control flow is performed to the value of the parameter D described above. The processing of Step S108 and the determination in the subsequent Step S110 are periodically repeated, and thus, the elapsed time Ti is a constant value corresponding to the period.

In Step S110, the controller 30 determines whether or not the value of the parameter D, that is, the elapsed time after the actuator operation is started is equal to or greater than the waiting time C set in Step S104. The controller 30 repeatedly performs the processing of Step S108 and the determination in Step S110 until the elapsed time reaches the waiting time C.

If the elapsed time reaches the waiting time C, the controller 30 performs the processing of Step S112. In Step S112, the controller 30 starts switching the combustion mode from the stoichiometric mode to the homogeneous lean mode. More specifically, the controller 30 starts changing the operation quantities that determine the combustion mode, such as the throttle opening angle, the share ratio of the fuel injection amount among the injection valves, and the ignition timing. This is the end of this control flow.

5-2. Operation of Engine in Switching from Stoichiometric Mode to Homogeneous Lean Mode If the control flow described above is performed, the engine 1 operates as shown the time charts of FIGS. 8 to 13, for example.

Figure 8:
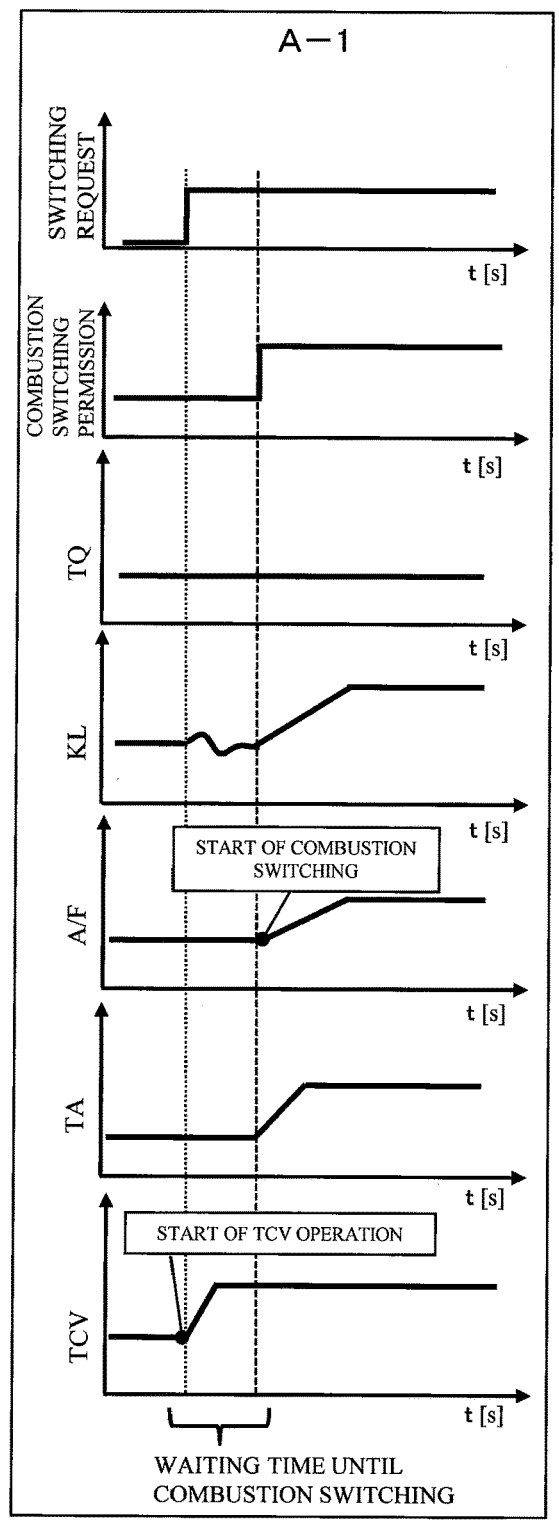
FIG. 8 is a time chart showing an example of an operation of the internal combustion engine in the case where the control flow shown in FIG. 7 is performed when switching the combustion mode while maintaining a constant torque.
Figure 9:
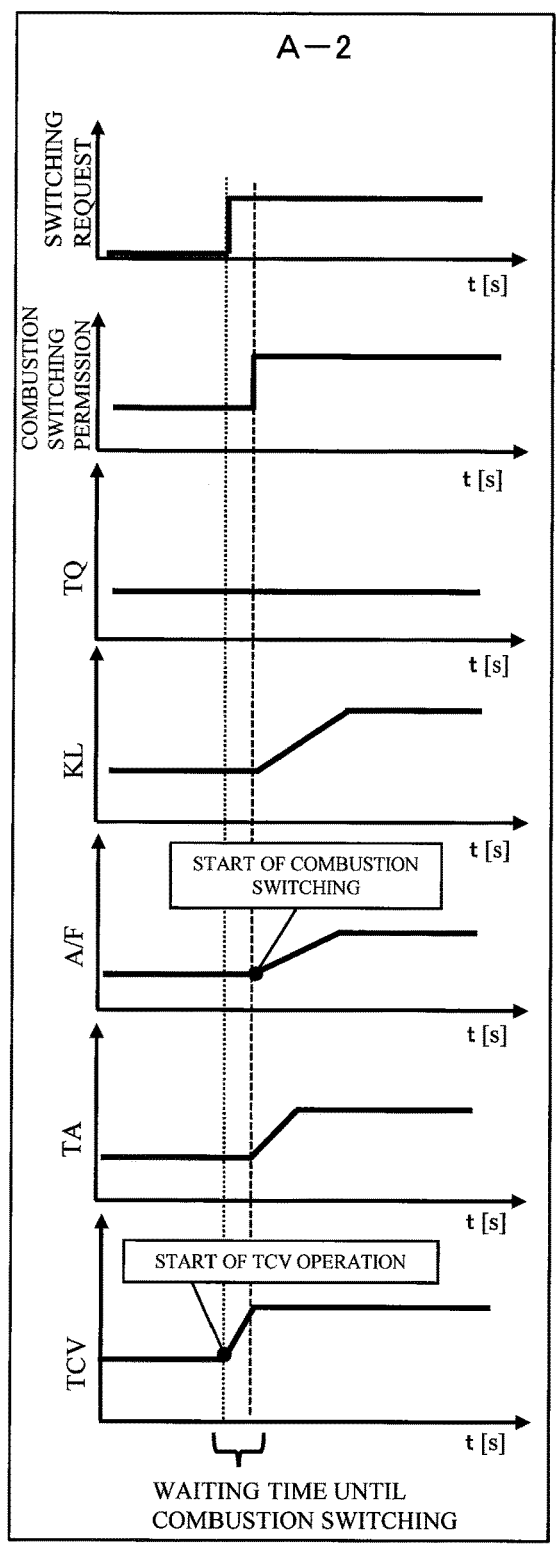
FIG. 9 is a time chart showing another example of an operation of the internal combustion engine in the case where the control flow shown in FIG. 7 is performed when switching the combustion mode while maintaining a constant torque.
Figure 10:
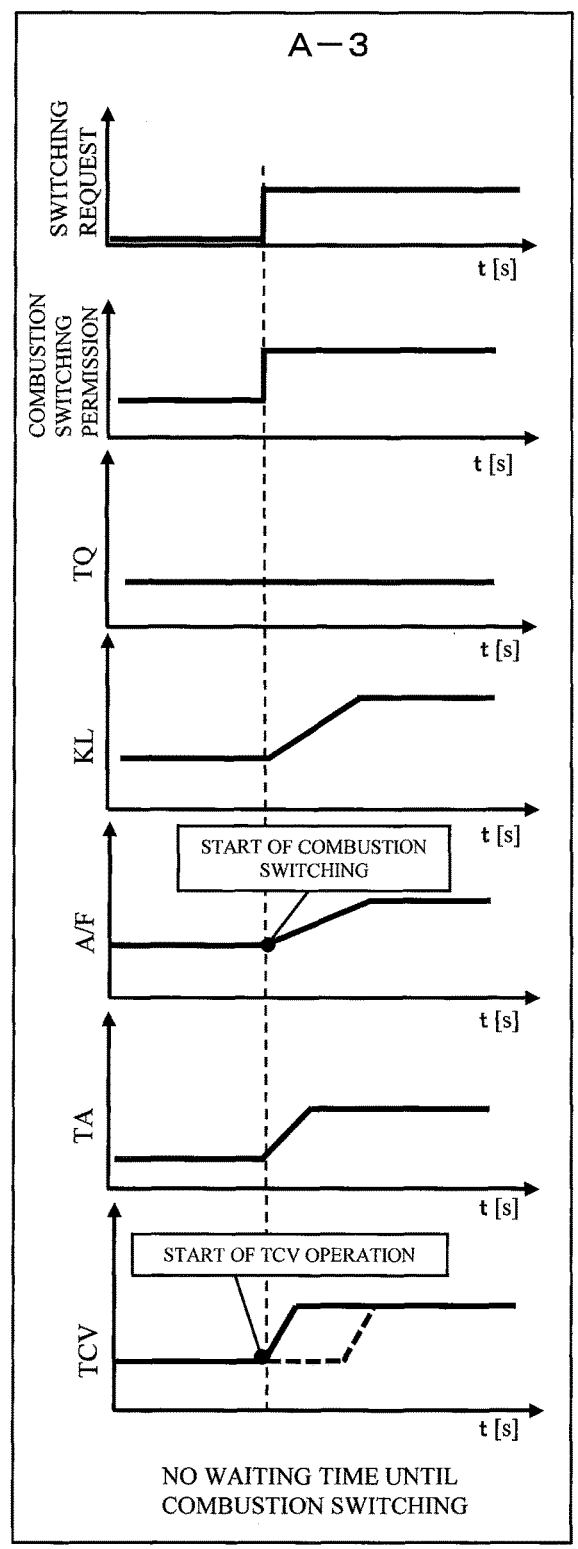
FIG. 10 is a time chart showing another example of an operation of the internal combustion engine in the case where the control flow shown in FIG. 7 is performed when switching the combustion mode while maintaining a constant torque.

FIGS. 8 to 10 are sets of time charts showing operations of the engine 1 in the case where the combustion mode is switched from the stoichiometric mode to the homogeneous lean mode while maintaining a constant torque. Provided that the current operating point is the operating point Z in FIG. 3 described above, and the target operating point is the operating point X, the engine 1 operates as shown in these time charts. In the order from top to bottom, the time charts in each drawing show a variation with time of a flag indicating a combustion mode switching request, a variation of a flag indicating a combustion mode switching permission, a variation of the torque (TQ), a variation of the intake load factor (KL), the air-fuel ratio (A/F), the opening angle of the throttle 13 (TA) and the closure angle of the tumble control valve 12 (TCV). The "closure angle of the tumble control valve 12" means the degree of closure of the tumble control valve 12 with respect to full open as a reference.

A set of time charts A-1 shown in FIG. 8 shows an operation of the engine 1 in the case where the robustness of the combustion is low, a set of time charts A-2 shown in FIG. 9 shows an operation of the engine 1 in the case where the robustness of the combustion is medium, and a set of time charts A-3 shown in FIG. 10 shows an operation of the engine 1 in the case where the robustness of the combustion is high. The three sets of time charts differ in length of the waiting time from the time of start of operation of the tumble control valve 12 (denoted as "start of TCV operation" in the drawings) to the time of start of switching of the combustion mode (denoted as "start of combustion switching" in the drawings). In the set of time charts A-1, switching of the combustion mode is started when the variation of the air amount caused by the operation of the tumble control valve 12 is about to cease. To the contrary, in the set of time charts A-3, switching of the combustion mode is started when the operation of the tumble control valve 12 is started. In the set of time charts A-2, the combustion mode is switched after a medium waiting time between the waiting times in the sets of time charts A-1 and A-3.

In the set of timing charts A-3, a dotted line shows that the time of start of the operation of the tumble control valve 12 is delayed with respect to the time of start of switching of the combustion mode. If the robustness of the combustion is high, and stable combustion is achieved, the time of start of switching of the opening angle of the tumble control valve 12 can be delayed with respect to the time of start of switching of the combustion mode. If the tumble control valve 12 is kept fully open, a high intake efficiency can be maintained, so that the intake load factor can be quickly increased, and thus the air-fuel ratio can more quickly reach the control target air-fuel ratio.

Figure 11:
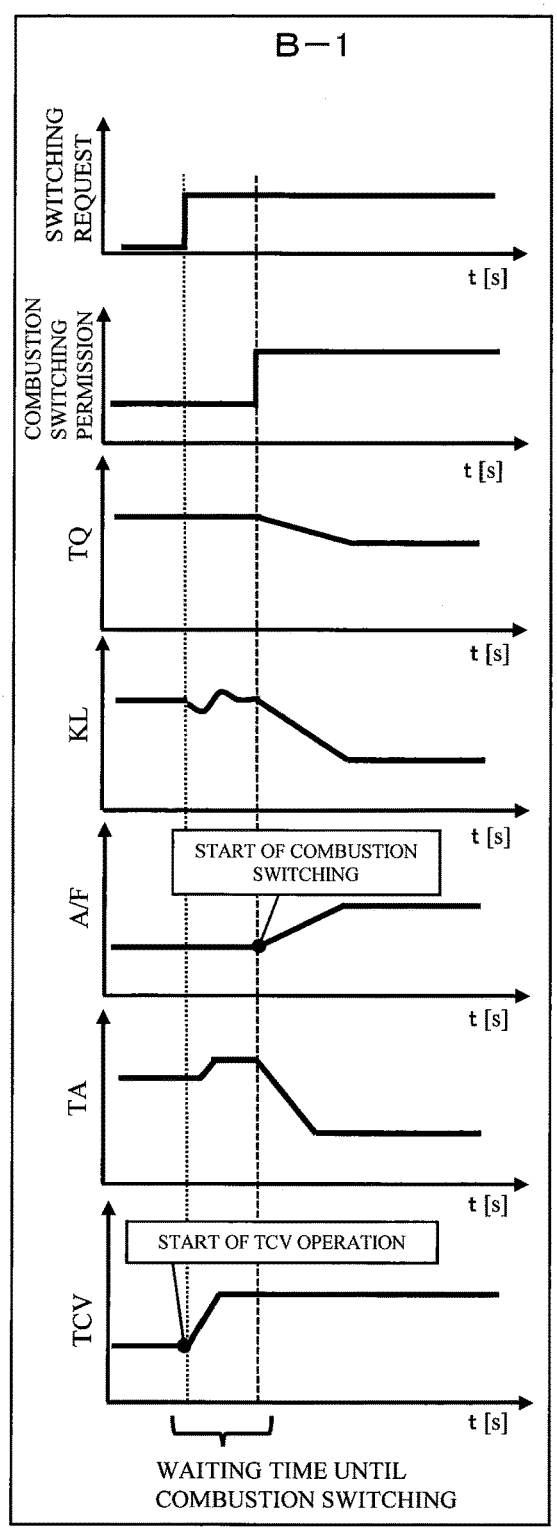
FIG. 11 is a time chart showing an example of an operation of the internal combustion engine in the case where the control flow shown in FIG. 7 is performed when switching the combustion mode in response to a decrease of the torque.
Figure 12:
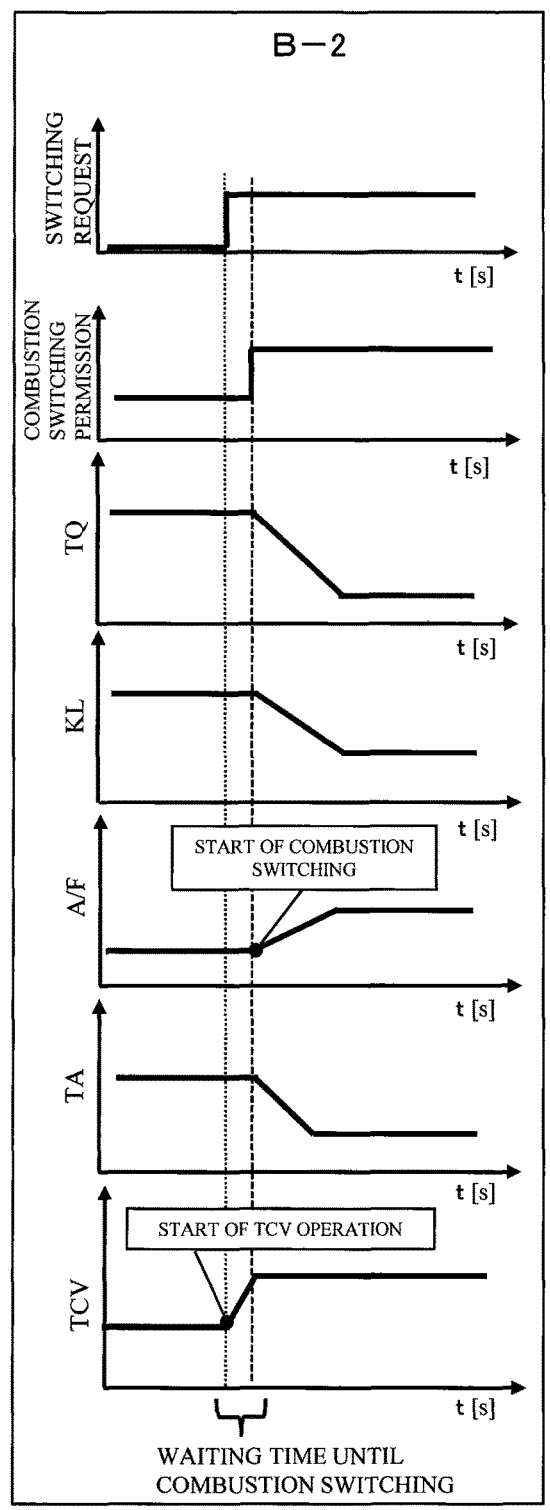
FIG. 12 is a time chart showing another example of an operation of the internal combustion engine in the case where the control flow shown in FIG. 7 is performed when switching the combustion mode in response to a decrease of the torque.
Figure 13:
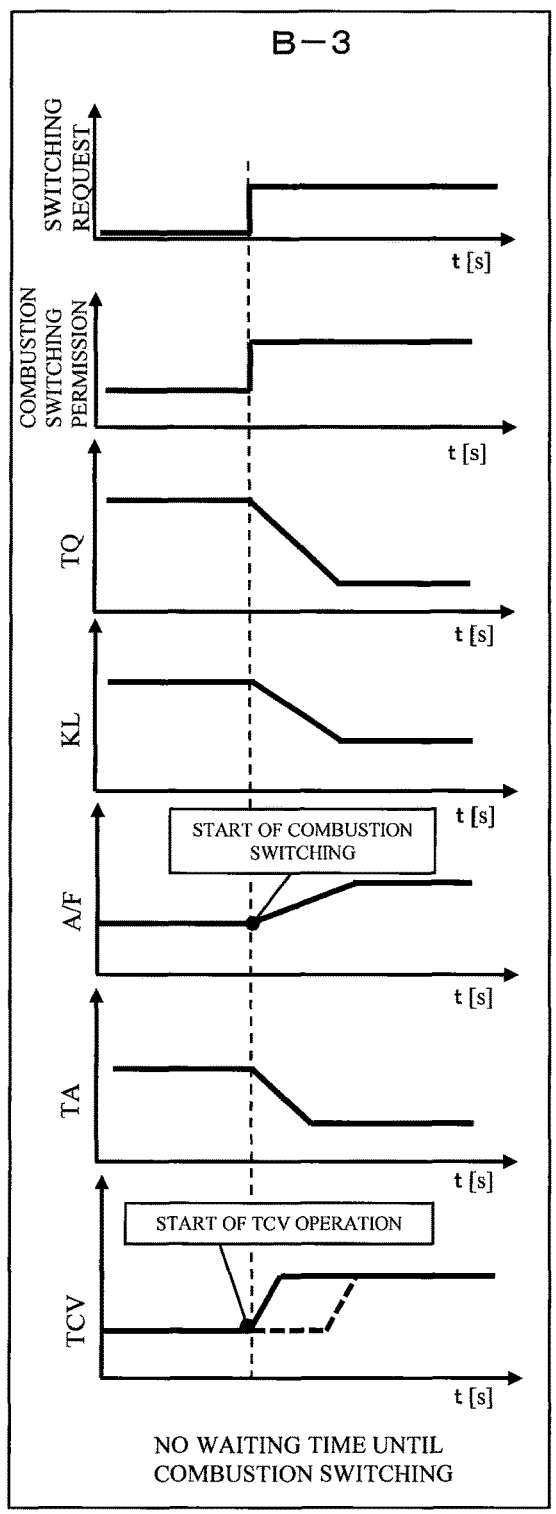
FIG. 13 is a time chart showing another example of an operation of the internal combustion engine in the case where the control flow shown in FIG. 7 is performed when switching the combustion mode in response to a decrease of the torque.

FIGS. 11 to 13 are sets of time charts showing operations of the engine 1 in the case where the combustion mode is switched from the stoichiometric mode to the homogeneous lean mode in response to a decrease of the torque. Provided that the current operating point is the operating point Y in FIG. 3 described above, and the target operating point is the operating point X, the engine 1 operates as shown in these time charts. A set of time charts B-1 shown in FIG. 11 shows an operation of the engine 1 in the case where the robustness of the combustion is low, a set of time charts B-2 shown in FIG. 12 shows an operation of the engine 1 in the case where the robustness of the combustion is medium, and a set of time charts B-3 shown in FIG. 13 shows an operation of the engine 1 in the case where the robustness of the combustion is high. The three sets of time charts differ in length of the waiting time from the time of start of operation of the tumble control valve 12 (denoted as "start of TCV operation" in the drawings) to the time of start of switching of the combustion mode (denoted as "start of combustion switching" in the drawings). In the set of time charts B-1, switching of the combustion mode is started when the variation of the air amount caused by the operation of the tumble control valve 12 is about to cease. To the contrary, in the set of time charts B-3, switching of the combustion mode is started when the operation of the tumble control valve 12 is started. In the set of time charts B-2, the combustion mode is switched after a medium waiting time between the waiting times in the sets of time charts B-1 and B-3.

Figure 14:
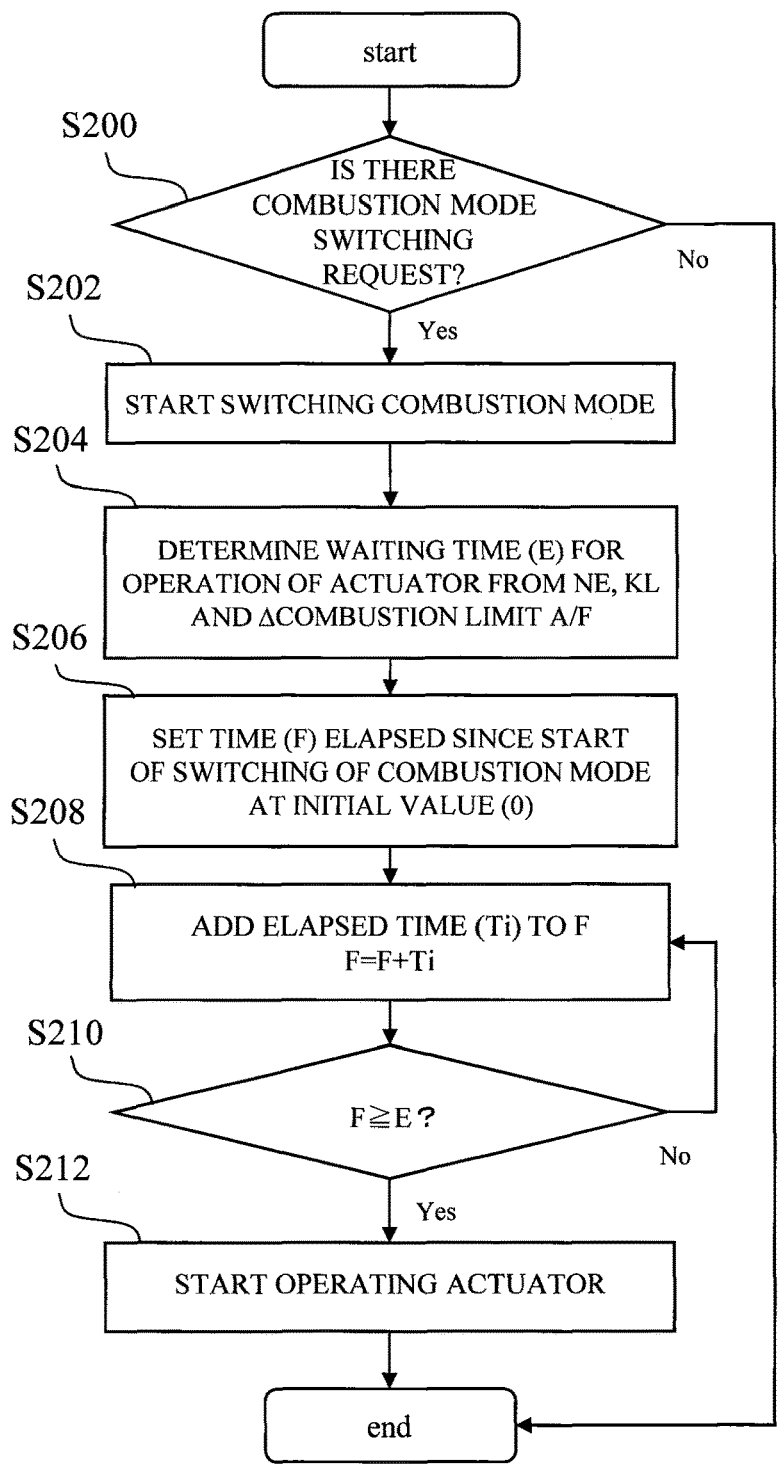
FIG. 14 is a flowchart showing a control flow performed when switching the combustion mode from the homogeneous lean mode to the stoichiometric mode.

5-3. Control Flow in Switching from Homogeneous Lean Mode to Stoichiometric Mode FIG. 14 is a flowchart showing a control flow of a combustion mode switching control performed by the controller 30 when switching the combustion mode from the homogeneous lean mode to the stoichiometric mode. The controller 30 reads a program created based on the control flow from the ROM and executes the program.

First, in Step S200, the controller 30 determines whether or not there is a combustion mode switching request. This "combustion mode switching request" means a request for switching from the homogeneous lean mode to the stoichiometric mode. The controller 30 determines that there is a switching request if the target operating point of the engine 1 moves from an operational region in which the homogeneous lean mode is selected to an operational region in which the stoichiometric mode is selected in a coordinate system in a two-dimensional plane whose coordinate axes show the engine speed and the torque. If there is no switching request, the current control flow ends.

If there is a combustion mode switching request, the controller 30 performs the processing of Step S202. In Step S202, the controller 30 starts switching the combustion mode from the homogeneous lean mode to the stoichiometric mode. More specifically, the controller 30 starts changing the operation quantities that determine the combustion mode, such as the throttle opening angle, the share ratio of the fuel injection amount among the injection valves, and the ignition timing.

In Step S204, the controller 30 then determines a waiting time E before operation of an actuator is started from the engine speed (NE), the intake load factor (KL), and the variation of the combustion limit air-fuel ratio (A combustion limit A/F). The actuators include the tumble control valve 12, the intake variable valve device 15, the exhaust variable valve device 18, and the electronic thermostat 23. The waiting time E is determined by using the maps configured as shown in FIG. 6. In the coordinate system in the two-dimensional plane whose coordinate axes show the engine speed and the intake load factor, if the current operating point lies in the wide combustion limit margin region, the waiting time E is set to be relatively short, and if the current operating point lies in the narrow combustion limit margin region, the waiting time E is set to be relatively long. The waiting time E is set to be longer when the variation of the combustion limit air-fuel ratio is great than when the variation of the combustion limit air-fuel ratio is small.

In Step S206, the controller 30 then sets a parameter F, which shows the time elapsed since the switching of the combustion mode is started, at an initial value, 0.

In Step S208, the controller 30 then adds an elapsed time Ti after Step S208 of the previous control flow is performed to the value of the parameter F described above. The processing of Step S208 and the determination in the subsequent Step S210 are periodically repeated, and thus, the elapsed time Ti is a constant value corresponding to the period.

In Step S210, it is determined whether or not the value of the parameter F, that is, the elapsed time after the switching of the combustion mode is started is equal to or greater than the waiting time E set in Step S204. The controller 30 repeatedly performs the processing of Step S208 and the determination in Step S210 until the elapsed time reaches the waiting time E.

If the elapsed time reaches the waiting time E, the controller 30 performs the processing of Step S212. In Step S212, the controller 30 starts operating the actuator. The "operation of an actuator" means an operation involved with changing the operation quantity of the actuator from a value suitable for the homogeneous lean mode to a value suitable for the stoichiometric mode. If the controller 30 starts operating the tumble control valve 12, for example, switching from the opening angle of the tumble control valve 12 from the closed state to the open state is started. This is the end of this control flow.

5-4. Operation of Engine in Switching from Homogeneous Lean Mode to Stoichiometric Mode If the control flow described above is performed, the engine 1 operates as shown in the time charts of FIGS. 15 to 17, for example.

Figure 15:
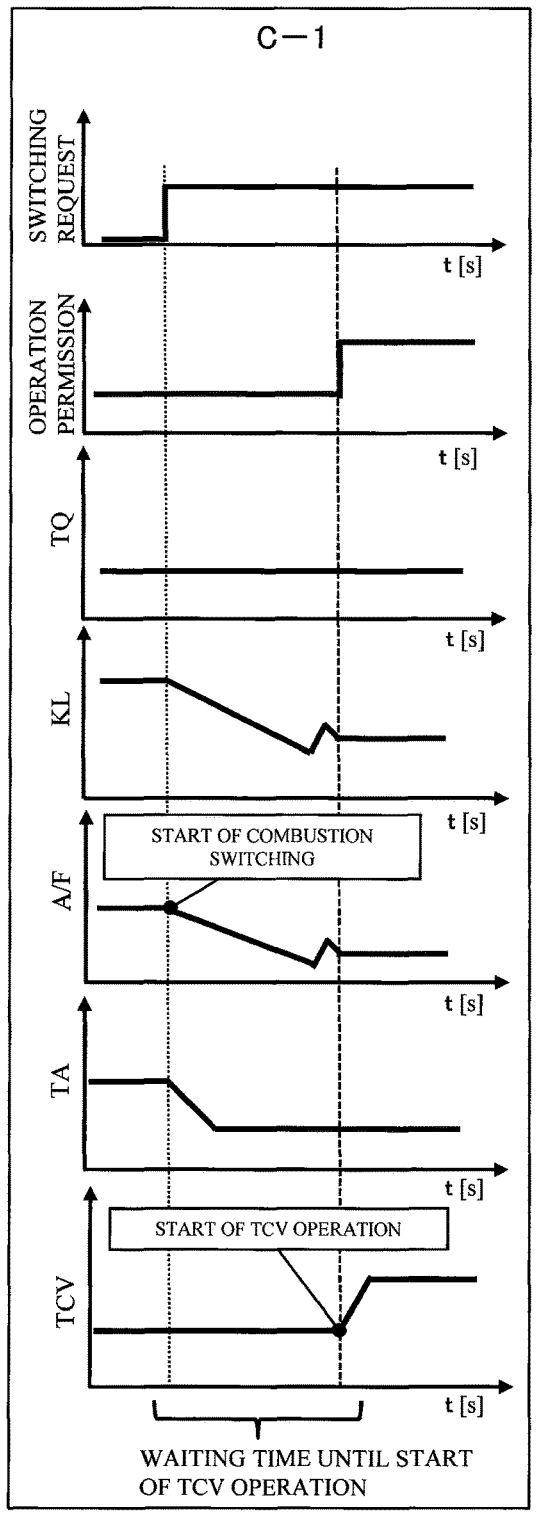
FIG. 15 is a time chart showing an example of an operation of the internal combustion engine in the case where the control flow shown in FIG. 14 is performed when switching the combustion mode while maintaining a constant torque.
Figure 16:
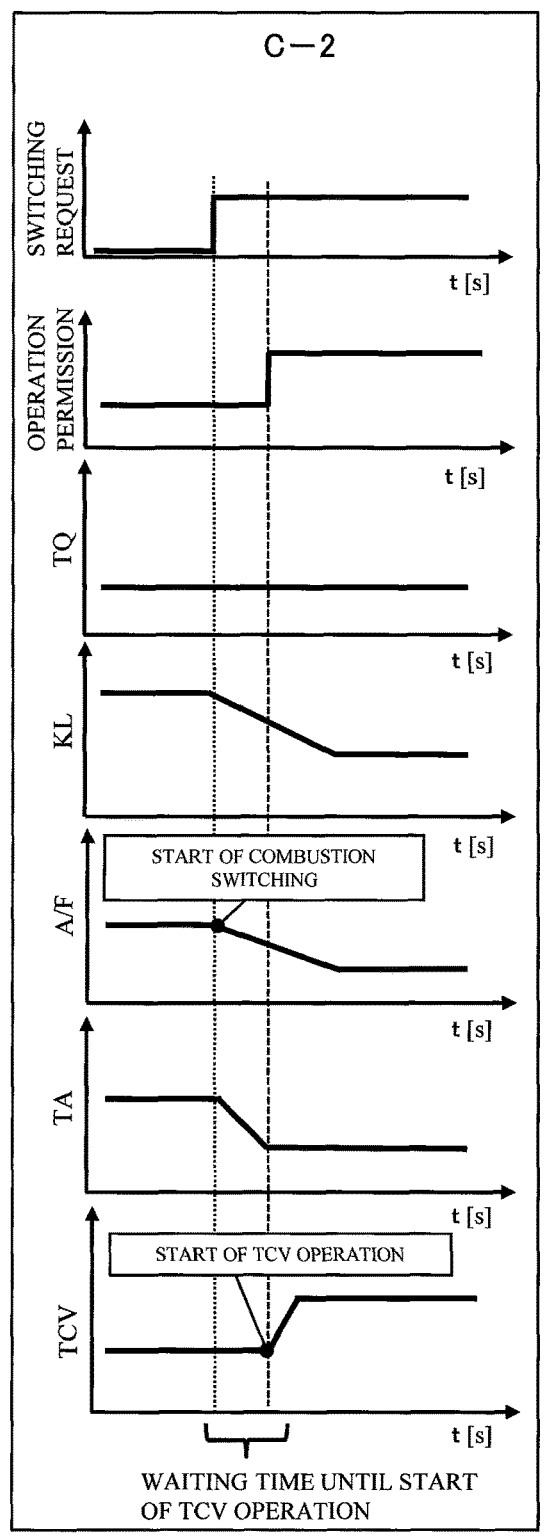
FIG. 16 is a time chart showing another example of an operation of the internal combustion engine in the case where the control flow shown in FIG. 14 is performed when switching the combustion mode while maintaining a constant torque.
Figure 17:
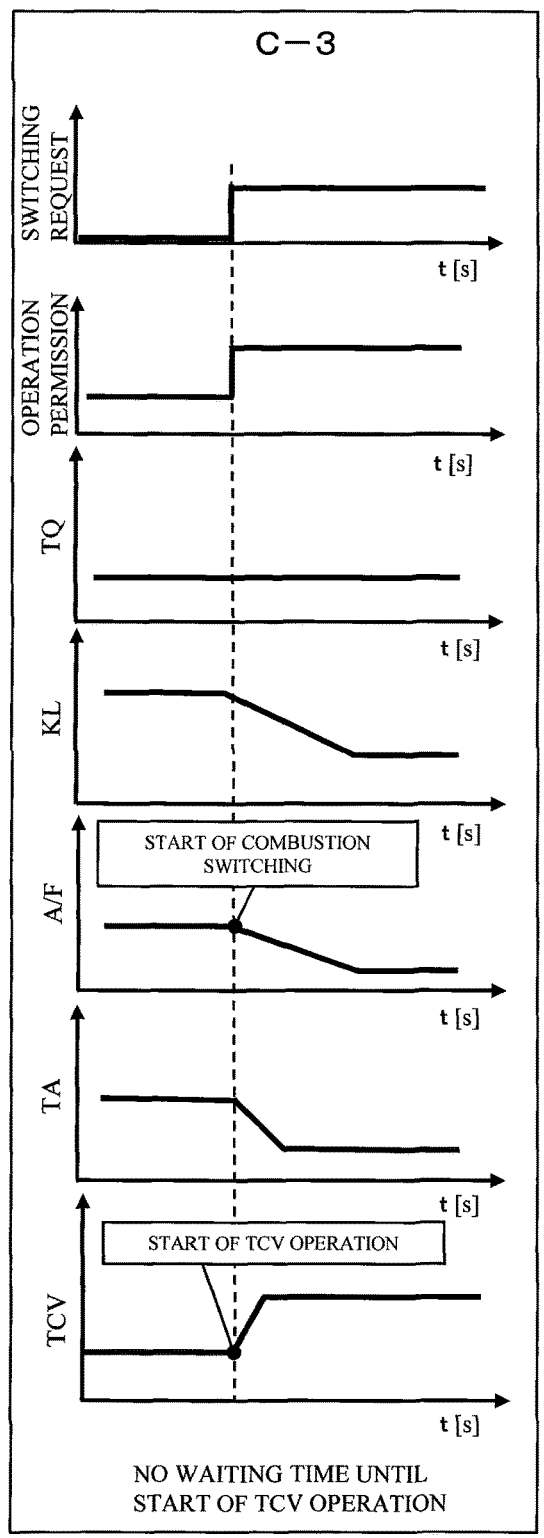
FIG. 17 is a time chart showing another example oft an operation of the internal combustion engine in the case where the control flow shown in FIG. 14 is performed when switching the combustion mode while maintaining a constant torque.

FIGS. 15 to 17 are sets of time charts showing operations of the engine 1 in the case where the combustion mode is switched from the homogeneous lean mode to the stoichiometric mode while maintaining a constant torque. Provided that the current operating point is the operating point X in FIG. 3 described above, and the target operating point is the operating point Z, the engine 1 operates as shown in these time charts. A set of time charts C-1 shown in FIG. 15 shows an operation of the engine 1 in the case where the robustness of the combustion is low, a set of time charts C-2 shown in FIG. 16 shows an operation of the engine 1 in the case where the robustness of the combustion is medium, and a set of time charts C-3 shown in FIG. 17 shows an operation of the engine 1 in the case where the robustness of the combustion is high. The three sets of time charts differ in length of the waiting time from the time of start of switching of the combustion mode (denoted as "start of combustion switching" in the drawings) to the time of start of operation of the tumble control valve 12 (denoted as "start of TCV operation" in the drawings). In the set of time charts C-1, operation of the tumble control valve 12 is started when the variation of the air amount caused by the switching of the combustion mode is about to cease. To the contrary, in the set of time charts C-3, operation of the tumble control valve 12 is started when the switching of the combustion mode is started. In the set of time charts C-2, the operation of the tumble control valve 12 is stated after a medium waiting time between the waiting times in the sets of time charts C-1 and C-3.

6. Another Embodiment of Combustion Mode Switching Control

As information used in setting of the waiting time, the variation of the intake load factor can also be used in addition to the margin of the control target air-fuel ratio with respect to the combustion limit air-fuel ratio and the variation of the combustion limit air-fuel ratio. More specifically, the setting of the waiting time can be changed depending on the difference between the intake load factor at the current operating point and the intake load factor at the target operating point. This is because an unstable combustion is likely to occur in a transient state in which the intake load factor significantly varies. In the following, a control flow in the case where the variation of the intake load factor is used as information for setting the waiting time is used will be described.

Figure 18:
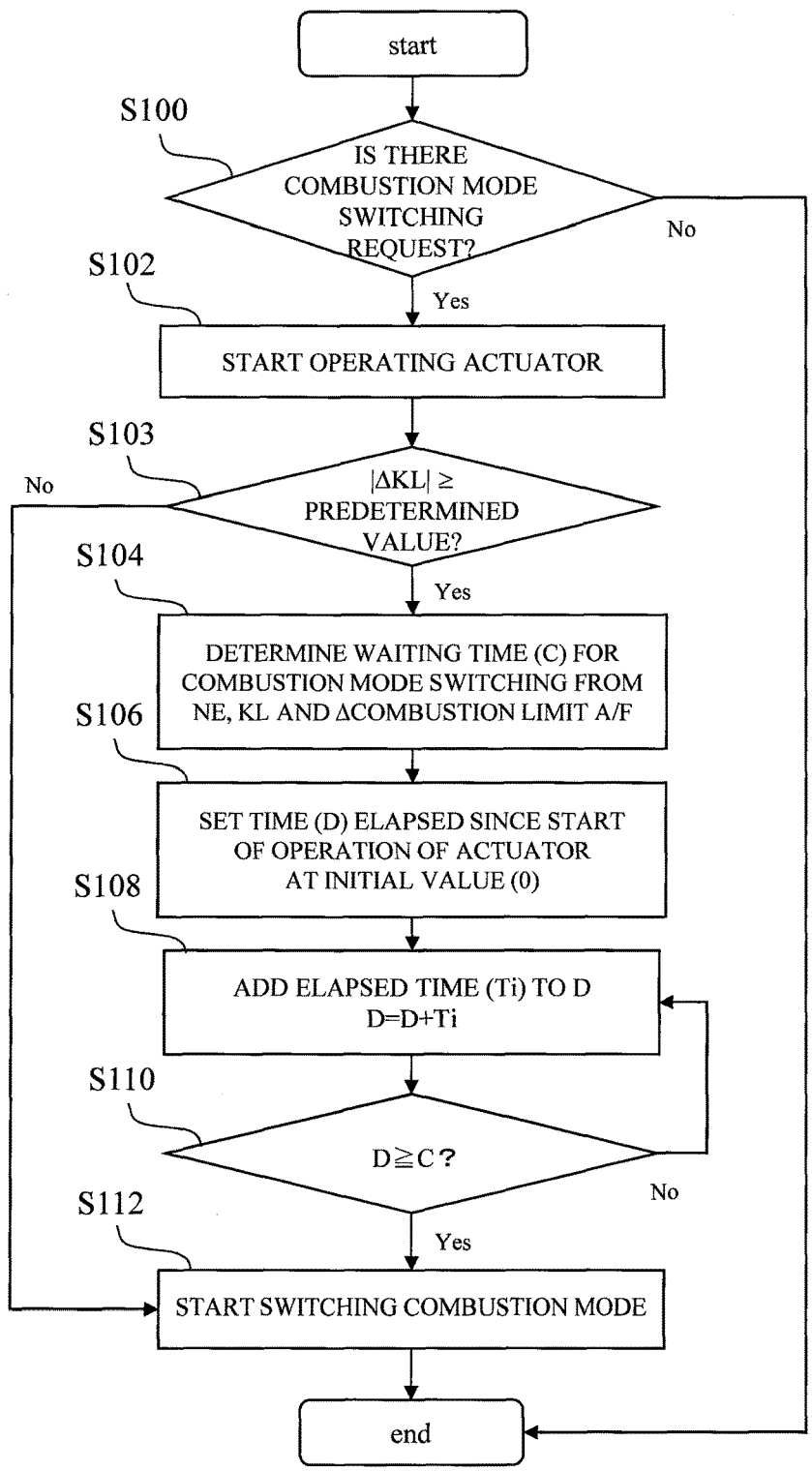
FIG. 18 is a flowchart showing a control flow performed when switching the combustion mode from the stoichiometric mode to the homogeneous lean mode according to another embodiment.

6-1. Control Flow in Switching from Stoichiometric Mode to Homogeneous Lean Mode FIG. 18 is a flowchart showing a control flow of a combustion mode switching control performed by the controller 30 when switching the combustion mode from the stoichiometric mode to the homogeneous lean mode. In this drawing, the steps in which the same processings as those in the control flow shown in FIG. 7 are performed are denoted by the same step numbers.

The control flow shown in FIG. 18 differs from the control flow shown in FIG. 7 in that a determination in Step S103 is performed after operation of an actuator is started and before the processings of Steps S104 to S110 are performed. In Step S103, the controller 30 calculates the difference (ΔKL) between the intake load factor at the current operating point and the intake load factor at the target operating point and determines whether or not the difference in intake load factor is equal to or greater than a predetermined value. If the difference in intake load factor is equal to or greater than the predetermined value, the controller 30 performs the processings of Steps S104 to S110. Through these processings, the waiting time from the start of the operation of the actuator to the start of the switching of the combustion mode is adjusted based on whether the target operating point lies in the wide combustion limit margin region or the narrow combustion limit margin region and based on the difference between the combustion limit air-fuel ratio at the current operating point and the combustion limit air-fuel ratio at the target operating point.

On the other hand, if the difference in intake load factor is smaller than the predetermined value, the controller 30 skips the processings of Steps S104 to S110 and performs the processing of Step S112. That is, the controller 30 starts switching the combustion mode at the same time as the start of the operation of the actuator. By changing the setting of the waiting time in response to the variation of the intake load factor in this way, stable combustion can be ensured in the transient state in which the intake load factor significantly varies, and at the same time, the combustion mode can be quickly switched from the stoichiometric mode to the homogeneous lean mode when the variation of the intake load factor is not significant and the combustion is relatively stable.

Figure 19:
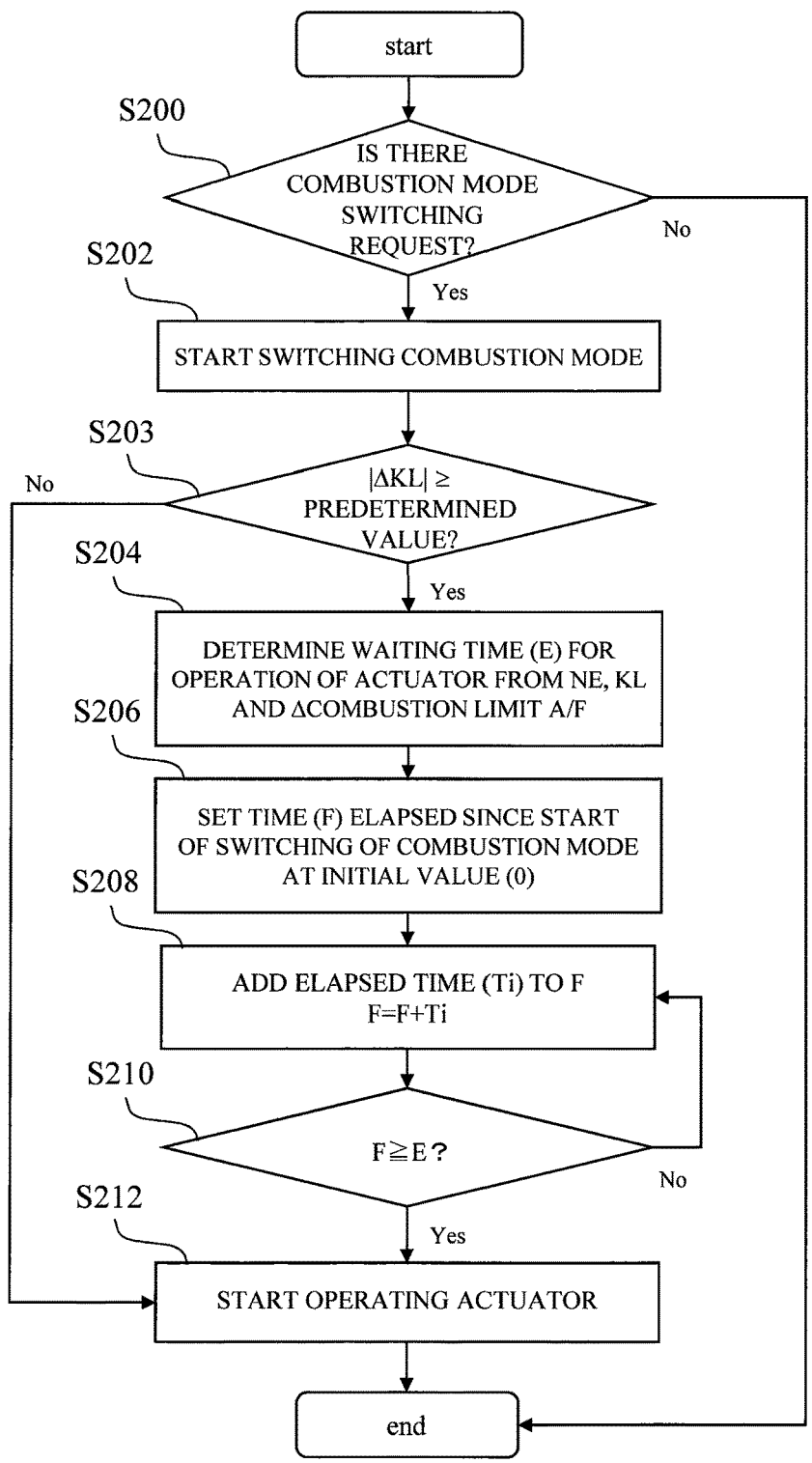
FIG. 19 is a flowchart showing a control flow performed when switching the combustion mode from the homogeneous lean mode to the stoichiometric mode according to another embodiment.

6-2. Control Flow in Switching from Homogeneous Lean Mode to Stoichiometric Mode FIG. 19 is a flowchart showing a control flow of a combustion mode switching control performed by the controller 30 when switching the combustion mode from the homogeneous lean mode to the stoichiometric mode. In this drawing, the steps in which the same processings as those in the control flow shown in FIG. 14 are performed are denoted by the same step numbers.

The control flow shown in FIG. 19 differs from the control flow shown in FIG. 14 in that a determination in Step S203 is performed after switching of the combustion mode is started and before the processings of Steps S204 to S210 are performed. In Step S203, the controller 30 calculates the difference (ΔKL) between the intake load factor at the current operating point and the intake load factor at the target operating point and determines whether or not the difference in intake load factor is equal to or greater than a predetermined value. If the difference in intake load factor is equal to or greater than the predetermined value, the controller 30 performs the processings of Steps S204 to S210. Through these processings, the waiting time from the start of the switching of the combustion mode to the start of the operation of the actuator is adjusted based on whether the current operating point lies in the wide combustion limit margin region or the narrow combustion limit margin region and based on the difference between the combustion limit air-fuel ratio at the current operating point and the combustion limit air-fuel ratio at the target operating point.

On the other hand, if the difference in intake load factor is smaller than the predetermined value, the controller 30 skips the processings of Steps S204 to S210 and performs the processing of Step S212. That is, the controller 30 starts operating the actuator at the same time as the start of the switching the combustion mode. By changing the setting of the waiting time in response to the variation of the intake load factor in this way, stable combustion can be ensured in the transient state in which the intake load factor significantly varies, and at the same time, the fuel economy and the operation performance can be improved by quick switching of the operation of the actuator when the variation of the intake load factor is not significant and the combustion is relatively stable.

7. Others

Although whether to set up the waiting time is determined based on the variation of the intake load factor in the control flows shown in FIGS. 18 and 19, whether to set up the waiting time may be determined based on whether or not the transmission is changing gears. That is, the waiting time may be set up only when the transmission is changing gears and the load is abruptly changing. Alternatively, the waiting time may be set up only when a deterioration of combustion is detected. The deterioration of combustion can be detected as a variation of the engine speed, a variation of the waveform of the rate of heat release, a variation of the air-fuel ratio, a variation of the temperature of the exhaust gas, or a variation of the amount of NOx emissions, for example.

In the embodiments described above, the engine 1 is provided with the tumble control valve 12. However, the present disclosure can also be applied to an engine provided with a swirl control valve as an air flow control valve.

What is claimed is:

1. An internal combustion engine capable of switching a combustion mode between a homogeneous lean mode in which fuel combustion occurs at an air-fuel ratio leaner than a theoretical air-fuel ratio in a state where a fuel and air are homogeneously mixed and a stoichiometric mode in which fuel combustion occurs at the theoretical air-fuel ratio, comprising:

an air flow control valve that is provided on an intake channel and controls a strength of an air flow produced in a combustion chamber by adjusting an opening angle of the valve; and a controller that operates at least the air flow control valve, wherein the controller is configured so that:

in a case of selecting the homogeneous lean mode as the combustion mode, the controller switches the opening angle of the air flow control valve in response to selection of the combustion mode so as to produce a stronger air flow in the combustion chamber than in a case where the stoichiometric mode is selected as the combustion mode;

in a case of switching the combustion mode from the stoichiometric mode to the homogeneous lean mode, the controller starts switching of the combustion mode after switching of the opening angle of the air flow control valve is started; and in a case where, in switching of the combustion mode from the stoichiometric mode to the homogeneous lean mode, a target operating point of the internal combustion engine lies outside a predetermined operational region that is set in a range that excludes a low intake load factor region and includes at least a medium intake load factor and medium engine speed region of operational regions of the internal combustion engine defined by an engine speed and an intake load factor, the controller sets a waiting time from the start of switching of the opening angle of the air flow valve to the start of switching of the combustion mode to be longer than in a case where the target operating point lies in the predetermined operational region, and wherein the predetermined operational region is set in a range where a combustion limit air-fuel ratio, which is a limit value on a fuel lean side of a range of the air-fuel ratio in which stable combustion is achieved, is greater than the air-fuel ratio in the low intake load factor region.

2. The internal combustion engine according to claim 1, wherein the controller is configured so that, in a case where the difference between the intake load factor at a current operating point and the intake load factor at the target operating point is equal to or greater than a predetermined value in switching of the combustion mode from the stoichiometric mode to the homogeneous lean mode, the controller sets the waiting time from the start of switching of the opening angle of the air flow control valve to the start of switching of the combustion mode to be longer than in a case where the difference in the intake load factor is smaller than the predetermined value.

3. The internal combustion engine according to claim 1, wherein the controller is configured so that:

the controller stores the combustion limit air-fuel ratio in association with the engine speed and in association with the intake load factor; and in a case where the difference between a value of the combustion limit air-fuel ratio at the target operating point and a value at the current operating point is great in switching of the combustion mode from the stoichiometric mode to the homogeneous lean mode, the controller sets the waiting time from the start of switching of the opening angle of the air flow control valve to the start of switching of the combustion mode to be longer than in a case where the difference is small.

4. The internal combustion engine according to claim 3, wherein the controller is configured so that, in the switching of the combustion mode from the stoichiometric mode to the homogeneous lean mode, in a case where the intake load factor increases between the current operating point and the target operating point, the target operating point lies in the predetermined operational region, and the deviation between the value of the combustion limit air-fuel ratio at the target operating point and the value of the combustion limit air-fuel ratio at the current operating point is equal to or smaller than a predetermined value, the controller delays the start of switching of the opening angle of the air flow control valve with respect to the start of switching of the combustion mode.

5. The internal combustion engine according to claim 1, wherein the controller is configured to store the combustion limit air-fuel ratio and a control target air-fuel ratio in the homogeneous lean mode in association with the engine speed and in association with the intake load factor, and wherein a set of operating points at which a margin of the combustion limit air-fuel ratio with respect to the control target air-fuel ratio is equal to or greater than a predetermined value is defined as the predetermined operational region.

6. The internal combustion engine according to claim 1, wherein the controller is configured so that:

in a case of switching the combustion mode from the homogeneous lean mode to the stoichiometric mode, the controller starts switching of the opening angle of the air flow control valve after switching of the combustion mode is started; and in a case where, in switching of the combustion mode from the homogeneous lean mode to the stoichiometric mode, the current operating point of the internal combustion engine lies outside the predetermined operational region, the controller sets the waiting time from the start of switching of the combustion mode to the start of switching of the opening angle of the air flow valve to be longer than in a case where the current operating point lies in the predetermined operational region.

7. The internal combustion engine according to claim 6, wherein the controller is configured so that, in a case where the difference between the intake load factor at the current operating point and the intake load factor at the target operating point is equal to or greater than a predetermined value in switching of the combustion mode from the homogeneous lean mode to the stoichiometric mode, the controller sets the waiting time from the start of switching of the combustion mode to the start of switching of the opening angle of the air flow control valve to be longer than in a case where the difference in the intake load factor is smaller than the predetermined value.

8. The internal combustion engine according to claim 6, wherein the controller is configured so that:

the controller stores the combustion limit air-fuel ratio in association with the engine speed and in association with the intake load factor; and in a case where the difference between a value of the combustion limit air-fuel ratio at the target operating point and a value at the current operating point is great in switching of the combustion mode from the homogeneous lean mode to the stoichiometric mode, the controller sets the waiting time from the start of switching of the combustion mode to the start of switching of the opening angle of the air flow control valve to be longer than in a case where the difference is small.

* * * * *